(12) United States Patent
Hishinuma

(10) Patent No.: US 10,894,648 B2
(45) Date of Patent: Jan. 19, 2021

(54) METHOD OF FORMING A COMPOSITE HEAT SEAL STRUCTURE

(71) Applicant: Kazuo Hishinuma, Kanagawa (JP)

(72) Inventor: Kazuo Hishinuma, Kanagawa (JP)

( * ) Notice: Subject to any disclaimer, the term of this patent is extended or adjusted under 35 U.S.C. 154(b) by 53 days.

(21) Appl. No.: 16/041,126

(22) Filed: Jul. 20, 2018

(65) Prior Publication Data

US 2018/0334302 A1 Nov. 22, 2018

Related U.S. Application Data

(60) Division of application No. 15/375,609, filed on Dec. 12, 2016, now abandoned, which is a continuation of
(Continued)

(30) Foreign Application Priority Data

Aug. 22, 2014 (JP) .................................. 2014-169035
Feb. 23, 2015 (JP) .................................. 2015-033036

(51) Int. Cl.
*B65D 75/58* (2006.01)
*B65D 77/38* (2006.01)
(Continued)

(52) U.S. Cl.
CPC .......... *B65D 75/5855* (2013.01); *B29C 65/18* (2013.01); *B29C 65/20* (2013.01);
(Continued)

(58) Field of Classification Search
CPC .... B65D 75/5855; B65D 31/10; B65D 77/38; B65D 75/367; B65B 51/10; B65B 51/30;
(Continued)

(56) References Cited

U.S. PATENT DOCUMENTS 2,743,761 A * 5/1956 Snyder .................. B29C 65/305
156/583.3
3,120,336 A * 2/1964 Whatley, Jr. ........... B65D 33/16
383/210
(Continued)

FOREIGN PATENT DOCUMENTS

BE 755543 A 2/1971
CN 1558827 A 12/2004
(Continued)

OTHER PUBLICATIONS

International Search Report for PCT Patent App. No. PCT/JP2015/003189 (dated Sep. 8, 2015).
(Continued)

*Primary Examiner* — John L Goff, II
(74) *Attorney, Agent, or Firm* — Cermak Nakajima & McGowan LLP; Shelly Guest Cermak

(57) ABSTRACT

A compound heat seal structure that, when heat-sealing a bag with a stacked area level difference, reliably seals even a section having different level and that can be easily opened. A compound heat seal structure is provided as a peelable seal in a band shape on a bag and a linear heat seal is added as a peelable seal in that band-shaped peelable heat seal in the longitudinal direction thereof.

9 Claims, 19 Drawing Sheets

(c) [A-A'] section;
action conditions around linear rib
at 4 sheets area

Related U.S. Application Data application No. PCT/JP2015/003189, filed on Jun. 25, 2015.

(51) Int. Cl.

| | | |
|---|---|---|
| *B29C 65/18* | (2006.01) | |
| *B29C 65/22* | (2006.01) | |
| *B29C 65/82* | (2006.01) | |
| *B29C 65/00* | (2006.01) | |
| *B65B 51/14* | (2006.01) | |
| *B29C 65/76* | (2006.01) | |
| *B65B 51/10* | (2006.01) | |
| *B29C 65/20* | (2006.01) | |
| *B65D 30/20* | (2006.01) | |
| *B65D 75/36* | (2006.01) | |
| *B29L 31/00* | (2006.01) | |

(52) U.S. Cl.
CPC ............ *B29C 65/222* (2013.01); *B29C 65/76* (2013.01); *B29C 65/8215* (2013.01); *B29C 65/8223* (2013.01); *B29C 65/8246* (2013.01); *B29C 66/112* (2013.01); *B29C 66/1122* (2013.01); *B29C 66/131* (2013.01); *B29C 66/133* (2013.01); *B29C 66/346* (2013.01); *B29C 66/3452* (2013.01); *B29C 66/43* (2013.01); *B29C 66/43121* (2013.01); *B29C 66/53461* (2013.01); *B29C 66/81264* (2013.01); *B29C 66/81427* (2013.01); *B29C 66/81457* (2013.01); *B29C 66/8242* (2013.01); *B29C 66/8322* (2013.01); *B29C 66/919* (2013.01); *B29C 66/929* (2013.01); *B65B 51/10* (2013.01); *B65B 51/14* (2013.01); *B65B 51/146* (2013.01); *B65D 31/10* (2013.01); *B65D 75/367* (2013.01); *B65D 77/38* (2013.01); *B29C 66/81422* (2013.01); *B29C 66/849* (2013.01); *B29L 2031/7128* (2013.01); *B29L 2031/7164* (2013.01)

(58) Field of Classification Search
CPC ..... B65B 51/303; B65B 51/306; B65B 51/14; B65B 51/146; B29C 65/20; B29C 65/76; B29C 65/8223; B29C 65/346; B29C 65/43121; B29C 65/81427; B29C 65/81457; B29C 65/81422; B29C 65/849; B29C 65/8491; B29C 65/851; B29C 65/8511; B29C 65/18; B29C 65/222; B29C 65/8215; B29C 65/8246; B29C 65/43122; B29C 65/43123; B29C 65/112; B29C 65/1122; B29C 65/131; B29C 65/133; B29C 65/3452; B29C 65/42; B29C 65/53461; B29C 65/81264; B29C 65/919; B29C 65/929; B29C 66/43; B29L 2031/7128; B29L 2031/7164

See application file for complete search history.

(56) References Cited

U.S. PATENT DOCUMENTS

| | | | |
|---|---|---|---|
| 6,197,136 B1 | 3/2001 | Hishinuma | |
| 6,216,420 B1 | 4/2001 | Mazzetto et al. | |
| 6,952,959 B2 | 10/2005 | Hishinuma | |
| 7,003,934 B1 * | 2/2006 | Yano | B29C 65/3656 53/374.2 |
| 2002/0117248 A1 | 8/2002 | Basque | |
| 2007/0034329 A1 * | 2/2007 | Padoy | B29C 65/18 156/274.4 |
| 2008/0187256 A1 | 8/2008 | Hishinuma | |
| 2010/0313526 A1 | 12/2010 | Busch et al. | |
| 2014/0033653 A1 | 2/2014 | Cham et al. | |
| 2014/0034213 A1 | 2/2014 | Cham et al. | |
| 2014/0215966 A1 | 8/2014 | Chiu | |
| 2017/0121083 A1 | 5/2017 | Hishinuma | |

FOREIGN PATENT DOCUMENTS

| | | | |
|---|---|---|---|
| CN | 101287596 A | 10/2008 | |
| CN | 102448846 A | 5/2012 | |
| EP | 0484998 A1 | 5/1992 | |
| GB | 1000215 A * | 8/1965 | .......... B29C 66/342 |
| JP | 62-185208 U | 11/1987 | |
| JP | 2-120380 A | 5/1990 | |
| JP | 9-240607 A | 9/1997 | |
| JP | 10-119931 A | 5/1998 | |
| JP | 11-310209 A | 11/1999 | |
| JP | 2000-085708 A | 3/2000 | |
| JP | 2002-321284 A | 11/2002 | |
| JP | 2006-021791 A | 1/2006 | |
| JP | 2008-189363 A | 8/2008 | |

OTHER PUBLICATIONS

Supplementary European Search Report for European Patent App. No. 15834127.1 (dated Nov. 20, 2017).

Hishinuma, K., "Newly Technical Development for Reform of Heat Seal Management", Worldpak 2002, (2002), vol. 1, Book 2, pp. 962-971, CRC Press LLC, USA.

\* cited by examiner

FIG. 3A (a) peelable seal [interfacial adhesion]

FIG. 3B (b) rupture seal [agglomerate bonding]

FIG. 3C (c) tensile test pattern

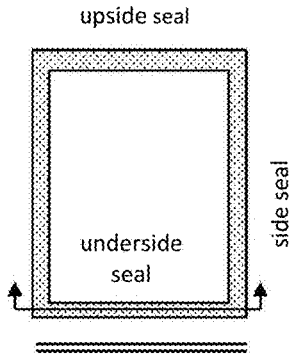

[section of heat seal area]
(b) four-sided fin seal bag
two sheets were piled, and
four sides were heat-sealed

FIG. 6A

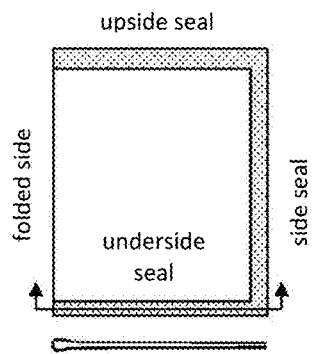

[section of heat seal area]
(a) three-sided fin seal bag
a sheet was folded and free
sides were heat-sealed

FIG. 6B not unified scale reduction

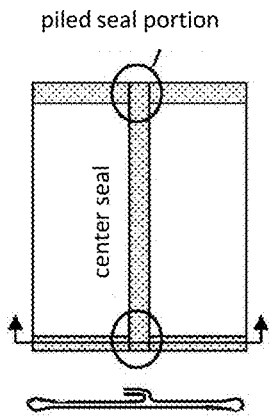

[section of heat seal area]
(c) pillow type bag (back side)
Side seal is located at center of back
and upside and underside ae sealed

FIG. 6C

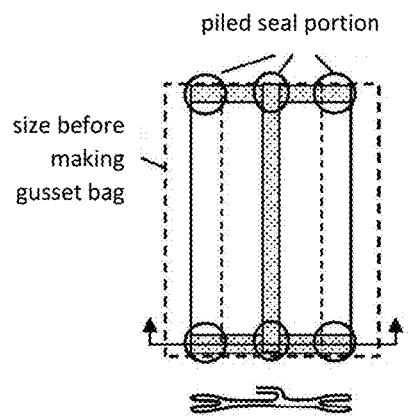

[section of heat seal area]
(d) gusset bag (back side)
After tack is provided on sides of pillow
type bag, upside and underside are
sealed. It becomes stereo form by
charging contents

FIG. 6D

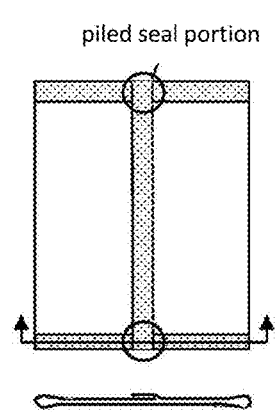

[section of heat seal area]
(e) envelope type bag (back side)
Sealant is provided on both
sides of material to be 2
sheets piled seal.
Thereby removes fin.

FIG. 6E

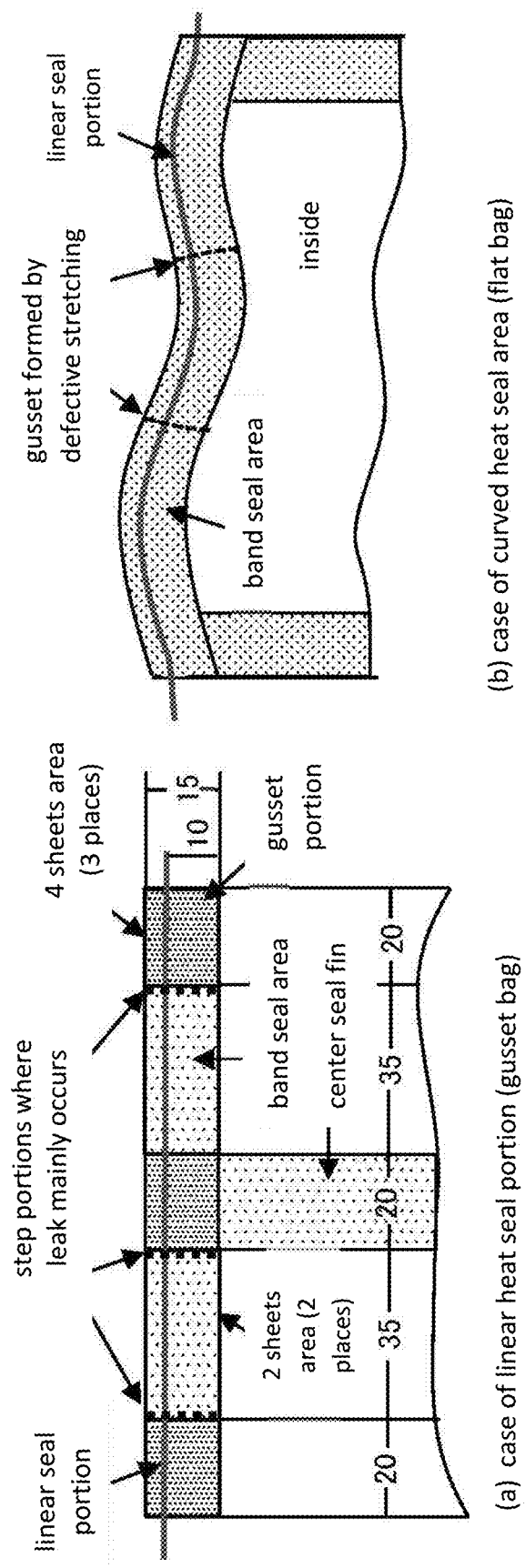

(a) Construction of adhesion at step portion (before pressing action)

(b) construction of adhesion at step portion (at point of pressing finished ; rib portion is not shown)

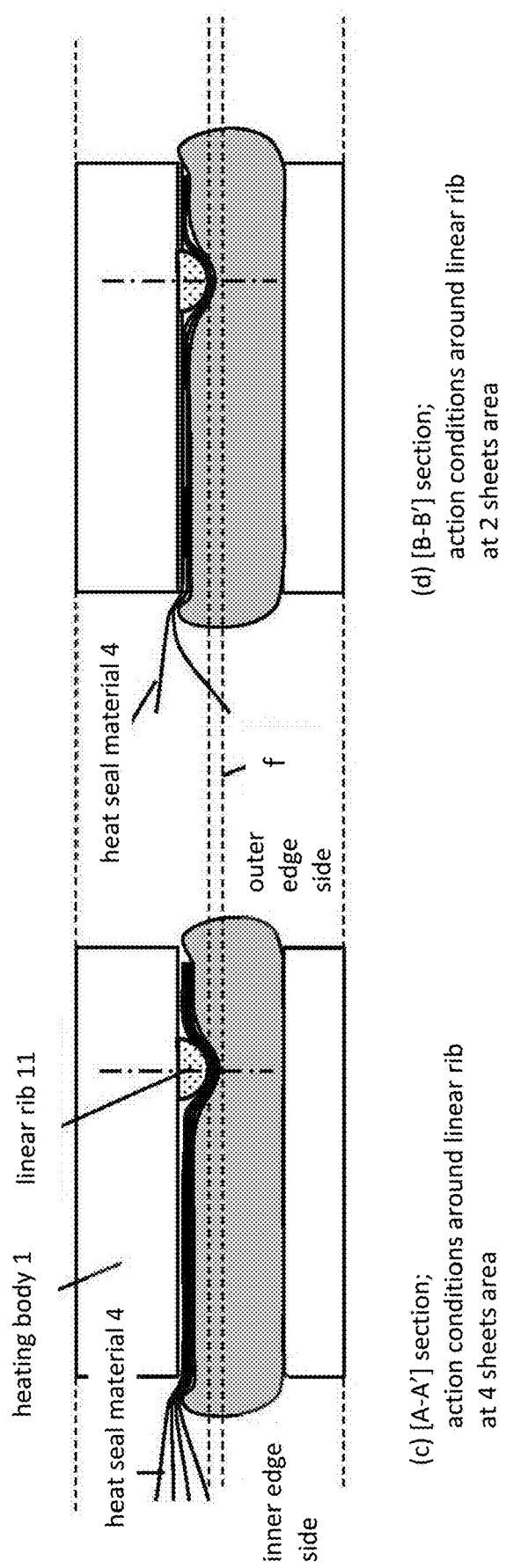
FIG. 11C (c) [A-A'] section; action conditions around linear rib at 4 sheets area
FIG. 11D (d) [B-B'] section; action conditions around linear rib at 2 sheets area

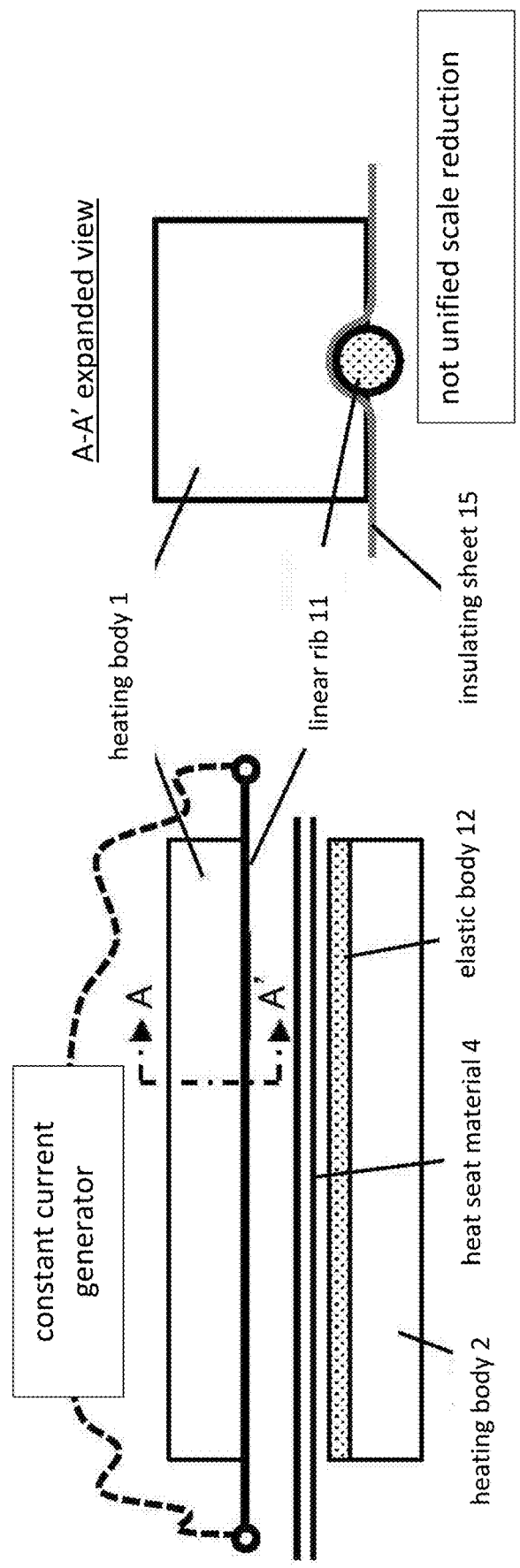

(b) Shore of elastic body ; A80, thickness of sheet ; sinking characteristics of 5mm

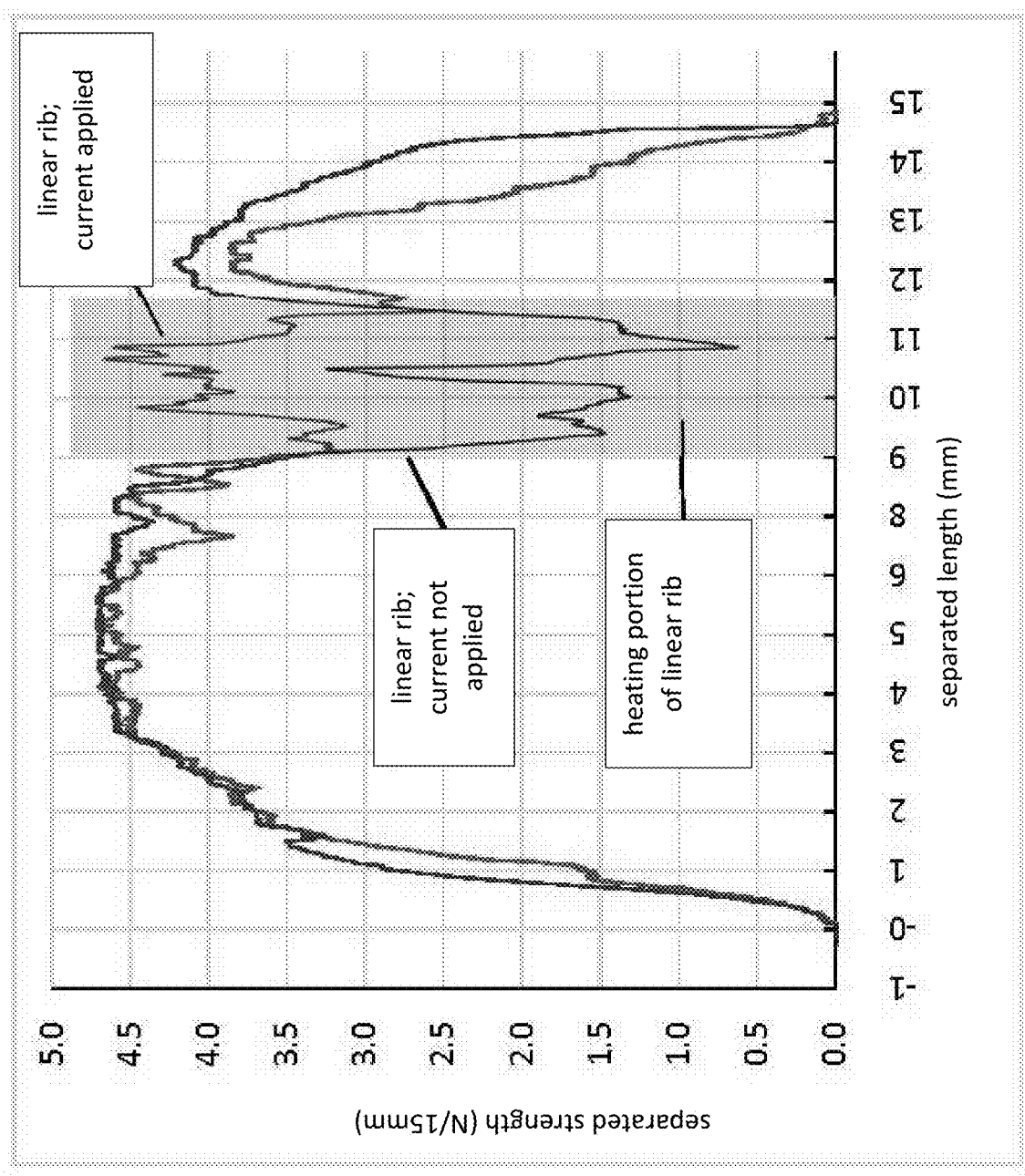

METHOD OF FORMING A COMPOSITE HEAT SEAL STRUCTURE

This application is a Division of, and claims priority under 35 U.S.C. § 120 to, U.S. patent application Ser. No. 15/375,609, filed 12 Dec. 2016, now abandoned, which was a Continuation of, and claimed priority under 35 U.S.C. § 120 to, International application number PCT/JP2015/003189, filed 25 Jun. 2015, and claims priority therethrough under 35 U.S.C. §§ 119, 365 to Japanese Patent Application No. 2014-169035, filed 22 Aug. 2014, and Japanese Patent Application No. 2015-033036, filed 23 Feb. 2015, which was patented as Japanese Patent No. 5779291, issued 17 Jul. 2015, the entireties of which are incorporated by reference herein.

BACKGROUND

Field of Endeavor

The subject matter of this application relates to a heat seal structure which can ensure sealing of the step line formed by piling at a heat seal portion of flexible packaging bags made by the application of plastic film or sheet, and which is easily openable.

Brief Description of the Related Art

Flexible packaging bags, to which a plastic film or sheet is applied, are sealed by heat bonding (heat seal) utilizing the thermoplasticity of plastics.

ASTM F88—(established in 1968), which has become a worldwide standard for the evaluation of heat seals, presents at the beginning that sealability and openability are expected as functions of a heat seal. However, any method satisfying the requirements has not still been presented.

FIG. 1 illustrates a sectional view of the construction of a sandwich heating bodies system which is a basis of heating technique for heat seal. As shown in the figure, in the heat seal apparatus, a pair of heating bodies 1, 2 are provided opposite to each other which heat the heat-sealing material 4 to form a heat seal, the heat seal being carried out by moving them. The heating bodies 1, 2 are automatically controlled so that the heating surfaces to contact with the heat-sealing material 4 are set at a prescribed heating temperature. Usually, they are set at the same temperature. The heat-sealing material 4 is pressed for a period until the bonding surface (heat seal area 3) reaches a prescribed temperature by the heat transfer from the heating bodies 1, 2. Thereafter, the contact of the heating bodies 1, 2 is promptly released, and the temperature is returned to the ordinary temperature by natural heat dispersion or preferably by cooling to complete the heat-bonding (heat seal).

Bonding phenomenon of plastics starts from interfacial adhesion (temperature zone Tp) only between the bonding surfaces together with a temperature elevation of the bonding surfaces, and an adhesive force (heat seal strength) gradually increases. (see FIG. 2)

A peelable seal, where adhered surfaces are separable, can be measured by cutting a sample at each heating temperature into rectangles, and pinching non-bonded ends to conduct a tensile test. (see FIGS. 3 (a), (c))

When an adhesive layer (sealant) is melted, the sealant becomes a mixed state in a heating temperature zone Tb. When it is cooled, the whole adhesive layer becomes an agglomerate bond in a mold state to lose bonding surfaces. Therefore, separation does not occur even by pulling the ends of the bonding surfaces. (see FIGS. 3 (b), (c))

The tensile strength in the agglomerate bonding state is the elongation strength of the material or the breaking strength at the bonded edge. Conventionally, customary common knowledge is that the state of agglomerate bonding is good for a heat seal.

In the agglomerate bonding state, opening cannot be conducted by utilizing the separation between adhered surfaces.

In practical packaging bags, tensile force is added to the heat seal line on the inside of the heat seal area by the increase of internal pressure caused by the external force added to the bags, or by the impact by the transfer of contents caused by dropping or shaking during transportation. Caused by these actions, the heat seal line on the inside of the bag is broken to generate pinholes or bag rupture.

In the peelable seal state, loaded damage energy is converted to separation energy for bonded surfaces, and consumed. The tensile energy behaves equivalent to the actual bag rupture energy. When it is designed so that the integrated value of peeling energy is greater than breaking energy of agglomerate bonding (energy up to yield breaking), even if adhesion has a peelable seal strength smaller than breaking strength, the whole peelable seal area functions to protect the heat seal area from breaking by an external force. (see Japan Patent No. 5435813)

Simultaneously, a peelable seal has an important function, i.e., easy opening is expected at the heat seal area.

In the case of agglomerate bonding, melted sealant at a high temperature protrudes from the inside edge portion of heat seal line to form minute projections (polymer beads). When an end of a wrinkle overlaps with the polymer bead, load is concentrated there. Therefore, it is a problem that even by a small force, a minute rupture (being a pinhole) is generated, and bag rupture starts therefrom.

Plastic materials to be utilized for packaging are supplied in a form of a film or sheet, and are made into bags by a heat-sealing technique. Products are placed therein, and sealed.

There are several types of the bags formed by heat-sealing. Among them, a gusset bag has piled portions of the film or sheet forming the bag, such as a gusset folding portion, a center seal portion, and ends to be heat-sealed. The portions are thickened more than other portions, and there are steps at the boundary. Therefore, a heat seal is difficult to be performed there sufficiently. (see FIG. 6)

As a measure against a defect in sealing at the step portion, in the past the following means have been taken based on the rule of thumb.

i) To increase the thickness of sealant, it pursues the improvement by compensating for escaped sealant melted by the control of heating temperature (to render high temperature).

ii) Completion of close bonding is improved by the agglomerate bonding in a melted state. This impedes conduction of an easy opening which utilizes a peelable seal.

iii) Adhesive layers are provided on both surfaces of the material, and a step portion is made small by employing an envelope type seal where two-fold sheet bonding is carried out.

iv) Press bonding of a roughened surface is tried by using an embossed or knurled heating surface or using woven cloth. This method uses thinned plane heating, and therefore high temperature and high pressure bonding, as points are achieved which cause pinhole generation.

v) Heating bodies having a saw-toothed (serrated) heating surface are frequently used, where high pressure bonding is carried out as lines or points formed by metal bodies to each other. This method generates ruptures or pinholes at the step portion, and sure sealing at the step portion has not been successful.

vi) In planar bag making, corners are formed at four side ends after charging products to degrade appearance of the packaging bag. This can be improved by employing a gusset bag. However, overlapped portions increase which are difficult to heat-seal, and thus employment of a gusset bag is avoided.

vii) It has been tried to set an elastic body on one of the whole heating surface for the purpose of dispersion/equalization of pressure. However, since this is for only plane heating, it can compensate for only a small variation of pressing surface, and the improvement of close adhesion at the step portion has not been successful. Moreover, reasonable selection of the elastic body has not been presented.

viii) There is a twice pressing heating method, to press a specified step portion twice. However, there are defects that the step portion moves at each time, such that it is difficult to determine the exact portion, and it cannot address the place where an unforeseen situation occurs in the whole heating surface.

ix) In the case of a single layer material, it is sealed by applying fusion sealing to bond the section by agglomerate bonding. (Fusion sealing cannot be applied to laminated materials.)

In the aforementioned envelope type seal, although a 4-fold sheet portion turns to a 2-fold sheet portion, it is necessary to provide adhesive layers on both sides of the material. It raises costs, and complicates handling of the packaging materials. Nevertheless, satisfactory improvement has not been made. At present, the measure is taken by combinations of i) and iii)-viii), but satisfactory results have not been obtained.

SUMMARY

The conventional art, as discussed above, is narrowly focused on conducting heat sealing so as not to generate leaks at the step portion, and a heat seal capable of easy opening while a heat seal at the step portion is ensured, is quite unexpected.

The inventor herein first noted "Test by Flaw Detecting Solution" (JIS Z2343-1, Z2343-4, according to ASTM E1417/E1417M) for minute defect of a metal surface, as a means of evaluating sealability strictly as to commercial bags having a step portion formed by piling. He applied this to the leak test of packages, such as "JIS Z0238" or "ASTM D3078", and a test by flaw detecting solution was carried out as to many packages which were collected from the market and the contents had been taken out.

An outline of the test by flaw detecting solution is shown in FIG. 4. Distilled alcohol was dyed with red food dye and used as the flaw detecting solution. The body portion of the object bags was cut off, and the contents were carefully taken out. The flaw detecting solution was dripped from a syringe to around the heat seal line on the inside. Then, the permeating state was investigated by observation visually and using a magnifier. As a result, through holes having a diameter in the order of magnitude of tens to hundreds μm, where gases are easily leakable, were found in common at the step portion formed by piling and the like of many commercial packages.

The inventor cut off a part of the packaging bag material having a fault, and heat-sealed by a standard operation. The flaw detecting solution was dripped to around the seal line on the inside to investigate the occurrence of leakage. As shown in FIG. 5, it was confirmed that leakage was reproduced at the step portions and the like similar to the fault of the commercial samples.

The leak test by the flaw detecting solution can detect the leak easily at a high sensitivity, compared with the leak test of "JIS Z0238" or "ASTM D3078", and the usefulness of the test was confirmed. (see The 23th The Society of Packaging Science & Technology, Japan, Annual Meeting, Summaries, [d-01], p. 12-13)

It was found that the leaks generate in common at the step portion formed by piling.

It was confirmed that the "fault" of the articles on the market does occur not by the mistake of each field operation, but is a problem with the common mechanism in the conventional sealing operation against the step portion.

It can be seen that the step having a multiple thickness of the material is formed adjacent to the piled seal portion. At the folding portion, the height of the step increases by the addition of a flexing diameter. (see FIG. 5)

Namely, it is mechanically impossible to allow the whole area of the material to adhere closely by pressing the heat seal area having a step portion by solid flat surfaces in parallel. It was found that the insufficiently pressed area has an essential defect, that the area is heated not by direct heat transfer, but instead by radiation or heat transfer through the material, and therefore long heating or high temperature heating is needed, while the whole material is melted.

One aspect of the invention includes, in the heat-sealing of a bag having a step portion formed by piling, providing a heat-sealing apparatus and a heat-sealing method capable of ensuring sealing even at the step portion and easy opening.

Most heat-sealing techniques are conducted by pressing a heating body which is a plane heating solid. (see FIG. 1)

It has been found that heating spots are generated by incomplete press bonding, unless the parallelism or irregularity of the heating surface is made 10 μm or less. (The 22th Japan Packaging Society, Annual Meeting, Summaries, f-10, p. 124)

A characteristic of a gusset bag, which is a representative packaging bag having a step formed by piling, is to include three four-fold sheet seal portions at one heat seal side. A condition where this is pressed by a planar heating plate is shown in FIG. 7.

The gusset bag has gusset folding portions formed by folding both sides of the bag, and a center seal portion 5 formed at the center by sealing areas faced towards each other. When both ends are heat sealed, as shown in FIG. 7, the gusset folding portions 6-1, 6-2 on the two sides, and the center seal portion 5 at the center, are piles of 4 sheets, and the areas therebetween are piles of 2 sheets. Since there are two flexed portions 9 at the gusset folding portion, the portions proceed to be bonded by pressure loading, followed by pressing the center seal portion 5 with one flexed portion, and lastly, the 2-fold sheet portions 7 therebetween are bonded with pressure.

The press bonding force is different between the gusset folding portions 6-1, 6-2 and the center seal portion 5, and therefore the press bonding force to adhere all portions needs to add a force greater than the conventional force. Actually, by crushing the gusset folding portions 6-1, 6-2 and the flexed portion of the center seal portion 5, adhesion around the step portion formed by four sheet portions 8-1, 8-2, 8-3 can also be achieved.

In the case of the gusset folding portion 6-1, where the tops of gusset folding sides align, the load is concentrated without deviation of by the press bonding action, and the whole adhesion is achieved easily. However, actually, since it is difficult to remove minute deviations, when the tops misalign such as in the gusset folding portion 6-2, insufficiently adhered portions occur at the step portion 8-4 located on the underside of FIG. 7. The press bonding force is not exercised enough there, and heating is carried out by radiation and heat transfer through the material resulting in incomplete adhesion.

In order to achieve sufficient heat sealing, it is necessary to press to render gaps within 10 μm. Since the thickness of the plastic material used for packaging bag is tens to hundreds of μm, when an area having a different piled number exists, the step portions 8-1, 8-2, 8-3 are formed, as shown in FIG. 7. The heat sealing is incomplete there, and complete heat sealing is difficult.

Even at the incompletely adhered portions of minute size caused by the step portions formed by piling, the leakage of highly viscous liquid can be avoided. However, various troubles occur, such as loss of the functions as a moisture barrier and as vacuum packaging, penetration of microorganisms, easy permeation of gases, e.g., air and fragrance components, and dispersion of smell components of products into the surrounding environment, and thereby the quality of the packaged article is degraded. Therefore, the conventional gusset bags were improper for packaging articles containing gaseous toxic substances.

According to the measurement by the inventor, passed air volume through the through hole having a diameter of about 100 μm was about 8,600 ml/(atom•24 hr•2 position) and that of water was about 480 ml/(atom•24 hr•2 position). Since the volumes correspond to thousands to ten of thousands times that of gas barrier bags, it cannot be ignored. (see The 23th Japan Packaging Society, Annual Meeting, Summaries, [d-01], p. 12-13) The following elements participate in the generation of through holes at the step portion formed by piling.

(1) Bending stress at flexed portion
(2) Step size (thickness of material)
(3) Melting temperature of material
(4) Fluid transfer of adhesive layer
Addressing to the influence of the bending stress at flexed portion At the heat seal area where four sheet portions and two sheet portions coexist, there is a thickness difference twice that of the material, and when being flexed, the diameter of flexed portion is further added.

Accordingly, a level difference of the material of [(twice the thickness)+(1-2 times the outer diameter of flexed portion)] occurs at the step portion formed by piling.

Two flexed portions are piled at the gusset folding portions 6-1, 6-2.

Since the center seal portion 5 is one, a shortage of bonding pressure corresponding to the step of one flexed portion is generated at the center seal portion 5. Therefore, defective seal occurs more at the step portion 8-2 than at the step portions 8-1, 8-3.

By using a compression tester, the compression force for plastic deformation of a general packaging material [OPP/LLDPE] 63 μm in thickness, to render the folding portion flat at room temperature, was examined.

20-30N is needed for crushing the flexed portion per 10 mm in length of the folding portion. A suitable common heat seal pressure for planar heating is 0.1-0.4 MPa, which corresponds to a stress of 10-40N per 1 $cm^2$. When a folding portion coexists, the added load first acts for flattening the folding portion, followed by acting on the other portions being flat. Accordingly, when a folding portion exists, the rate of the stress to the flat portions decreases to create the conditions where expected press bonding cannot be achieved.

The inventor considered that, in order to achieve completion of adhesion at the step portion 8 adjacent to four sheets piled portion (gusset folding portion 6), it is necessary to add plastic deformation by crushing so that the thickness corresponding to three sheets of the material and the diameter of the flexed portion is made at least the thickness corresponding to two sheets of the material or less. (see FIG. 7)

When plastic deformation by crushing is carried out through planar loading, a very great load is required. Thereupon, the inventor chose not planar loading, but linear local loading.

A planar heat-resistant elastic body (silicone rubber) was mounted onto the pedestal for press bonding, and a heating jaw is provided with a linear rib 11 of which the height had been adjusted, on the other heating body (see FIG. 8).

By continuing the planar pressing still after the linear rib 11 had sunk into the material with its deformation at the locally pressed portion, the breakage of the material caused by the high pressure of the linear rib 11 can be self-controlled to essentially complete the press bonding at 4-sheets portion.

In order to simultaneously render the completion of the press bonding at the 2-sheets portion, this proposition can be solved by adjusting the depth of the planar press bonding utilizing the deformation of the elastic body.

The present disclosure was made based on these concepts and trial tests, and provides a composite heat seal structure, wherein a package is provided with a heat seal as a band-shaped peelable seal and a linear heat seal is added as a peelable seal into the band-shaped peelable seal in its longitudinal direction, and a method of heat-sealing a heat-sealing material using a heat seal apparatus which nips the heat-sealing material between a pair of heating bodies, wherein a linear rib with an arc-shaped cross section having a height of 0.05-2 mm is provided in the longitudinal direction of one of the heating surfaces, and an elastic body is mounted on the other heating surface, by conducting heat sealing with setting the heating bodies at a temperature for forming a peelable seal.

Effects of the subject matter described herein include:

(1) Incomplete adhesion can be solved at the step portion formed by piling plural sheets of bag material.

(2) Protection from breakage caused by external force at the sealed portion with minute local bonding and by the separation energy at the planar heating portion, can be devised by the combined formation of a seal by the rib and a planar band seal and by simultaneous operation.

(3) The bonding area is not necessarily be made by agglomerate bonding, but a sufficient seal is possible even by interfacial adhesion.

(4) When the planar seal portion is made as a peelable seal, resistance to bag rupture can be improved remarkably by utilizing separation energy. (Application development of Japanese Patent No. 3811145)

(5) Packaging bags having plural piled seal portions, such as gusset folding, can be introduced actively without minding the piled seal, and freedom of packaging form designs can be extended.

(6) By developing in the application toward planar seal bags, hindrance factor against sealability by small wrinkles of the material can be excluded to remarkably improve reliability. Furthermore, sealing can be ensured in a curved heat seal area.

(7) By developing in the application toward cups and solid packages for medicines, compatibility of easy opening and sealing can be improved.

(8) When heating conditions at the local bonding portion and planar portion are controlled separately by adding a heat generation function to the linear rib, sealability can be further raised by heating to create planar portion interfacial adhesion and to create the local bonding portion in the vicinity of the boundary between interfacial adhesion and agglomerate bonding or higher than that.

(9) Compatibility of easy openability and sealability can be devised by utilizing the heat seal portions.

BRIEF DESCRIPTION OF THE DRAWINGS

FIGS. 6A-6E are plan views of representative bag forms, and sectional views of heat seal areas.

FIGS. 10A, 10B are plan views showing a set position of the linear rib at a gusset bag and at a curved seal, respectively.

FIGS. 11A-D are sectional views showing a variation of elastic body when a gusset bag was heat-sealed by a heat seal apparatus described herein.

FIGS. 12A, 12B are schematic illustrations of the heat seal apparatus where heat generation function is added to the linear rib.

FIG. 14 is a graph showing the relationship between the separated length and the separation strength in the case of heating or not heating the linear rib.

DETAILED DESCRIPTION OF EXEMPLARY EMBODIMENTS

The subject matter of this application is applied fundamentally to the heat seal upon making packaging bags, and as shown in FIG. 6, representative bag forms include the following four bags:

(1) 4-sided fin seal bag made by doubling sheets in flat and sealing four sides.

(2) 3-sided fin seal bag made by folding a sheet and sealing three sides.

(3) Pillow-type bag made by folding a sheet to face seal areas each other, locating the seal areas around the center of rear side of the packaged product, to render so that only two places, i.e., the upside and the underside, of seal areas can be seen from the front side of the product.

(4) Envelope-type bag made by changing the seal portion facing each other in the pillow type bag to envelope type seal where two sheets are superimposed.

The pillow-type bag is a modification of the three-sided fin seal bag. First, using a molding tool, the facing line is located around the center of the back of the bag and sealed to form a center seal (sealed with facing each other). Thereafter, the upside and underside portions are sealed including the folded newly formed center seal portion (fin), and cut.

It is widely utilized because of changing easily from planar form to steric form.

However, since a step portion is generated by adding a folding portion, it has a problem of incomplete sealing. (see FIG. 7) When gussets in two lines are formed on both sides of a pillow-type bag, it becomes a gusset bag. Since the gusset bag is possible to be a stereo bag, it has characteristics of good appearance of commercial goods and good efficiency for charging them. Moreover, since it has good automating ability, many pillow type bags are utilized mainly for soft packaging in food fields. The fin of the center seal has a convenience of exhibiting a tab function, when opening the bag.

However, it is required to improve the sealing method at the step portion, because four sheets piled portions are formed at (three places), i.e., two ends (upside and underside) and the center seal, ×2. However, reasonable measures have not been presented up until now. (see FIG. 7) At present, a little leak is allowed.

The envelope-type bag is formed by changing the center seal portion, sealed with facing each other of the pillow type bag, to 2 sheets piled portion. It is characterized by a small step at the sealed area and no fin formed by the facing seal.

However, it is necessary to provide a sealant having bonding ability on both sides of the material which increases cost, and therefore its uses are restricted. In the case of a gusset bag, similar problems caused by the facing seal occur.

Sections at the heat seal area are added into FIG. 6, in which 5 bags are illustrated. From the figure, it can be seen that there are folds and piled portions in the bags, except the 4-sided fin seal bag and 3-sided fin seal bag, and they have a problem in uniform press sealing using a plate.

Figure 7:
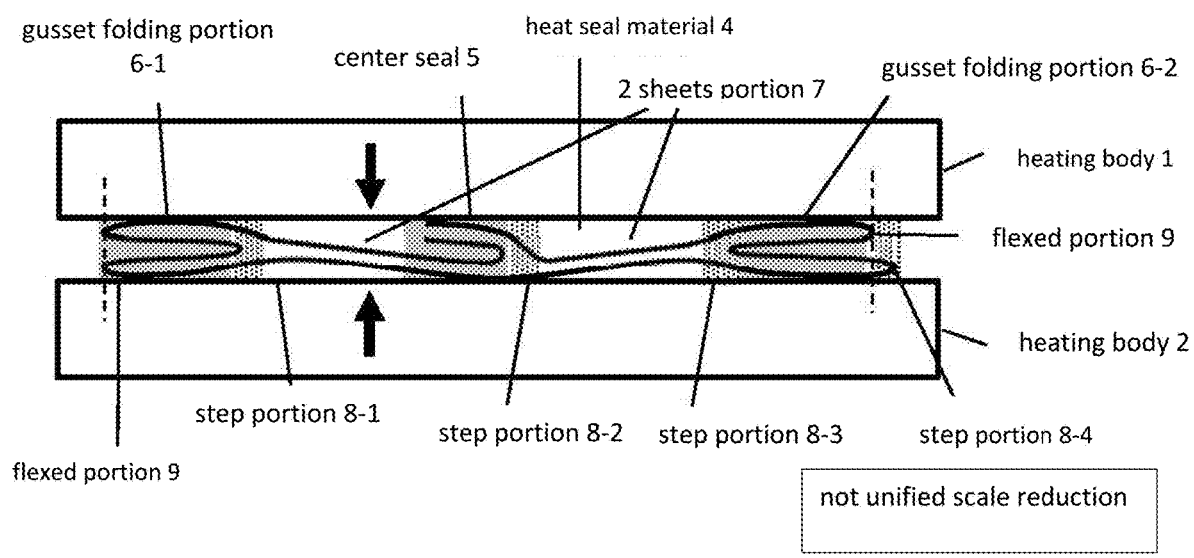
FIG. 7 is a sectional view indicating press bonding by plane heating of a gusset bag where piled portions coexist.

As can be seen from FIG. 7, the height of the step of the piled portion is formed commonly by the thickness of one or two films or sheets which are heat seal materials.

As stated previously, in the case of the bags having all bonding areas in a plane, such as a four-sided fin seal bag, close adhesion is easy, in principle, in sealing. However, when a product is charged in the planar bag, it becomes steric to generate gussets (tucks). Unless a stretching operation on the heat seal areas is proper on heat-sealing operations, steps are formed similar to gusset seal to generate defects in heat seal area.

Recently, not straight but curve-shaped heat seals are employed, caused by the reason of bag design, and in this case, stretching of heat seal areas is difficult (see FIG. 10B). The solution of problems in gusset bags is also a drastic measure against the generation of unexpected steps (gussets). Accordingly, the measure for step portions described herein is also effective for plane sealing.

The subject matter herein is not limited to bags, but is also widely applicable to cups and blister packaging into which tablets, capsules, or the like are accommodated.

Film and sheet, which are heat seal materials, are enough to have a heat-sealable layer, and may be formed of single layer or plural layers. The material of the heat-sealable layer may be any material capable of heat-sealing, and in general, is polyethylene, polypropylene, ethylene copolymers, or the like. In addition, not crystallized polyethylene terephthalate and the like are also usable. The thickness of the heat-sealable layer is usually about 3-200 μm, typically about 5-150 μm, without limiting specifically thereto. When referring to experimental results, 10% or more of the total thickness of the material is needed for the thickness of the heat-sealable layer to be applied to the seals described herein in order to compensate for the step portion.

The film or sheet composed of plural layers is constructed by laminating two types or more materials in order to improve printability, resistance to breakage, or gas barrier ability, to adjust rigidity of bags, to prevent adhesion of the material in softened state to the heating plate, or the like, and at least, an adhesive layer (sealant) which is the heat-sealable layer, is allocated to one of the surface layers. The material of the surface layer which becomes the outside layer of the bag, is selected from the materials wherein plasticization does not occur in the temperature range where the heating of the adhesive layer is applied. Although a material having flexural stiffness is convenient for planar bonding, it has not been noted as a fault in design that softening is insufficient in the proper heating temperature range of the adhesive layer, which would be an obstacle to sealing in a seal containing a flexed portion.

The thickness of the film or sheet composed of plural layers is usually about 2-200 μm, typically about 20-120 μm, without limiting specifically thereto.

The heat seal width of the bags may be usual, in general about 3-20 mm, typically about 5-15 mm. The heat seal width may be identical at all heat seal areas, or may be different, for example, between the upside seal portion and the center seal portion.

The composite heat seal structure described herein includes a band-shaped peelable heat seal, wherein a peelable seal is provided in a band shape, and a linear peelable heat seal is located therein in the longitudinal direction.

The band-shaped peelable heat seal is provided, in the case of a packaging bag, or a side to be opened, and the width is in general about 3-30 mm, typically about 5-15 mm. A preferred adhesive strength (heat seal strength) which is a peelable strength, is usually about 2-15N/15 mm, generally about 2-12N/15 mm. By setting the adhesive strength in this range, the strength can address individual uses having a restriction, such as to be difficult to open by children.

The following experiments were conducted in order to confirm the effects of the linear heat seal (occasionally referred to as a "stripe seal" herein).

Confirmation of local close adhesion conditions by variation in the height of the linear rib and the heating temperature, and whether close adhesion by crush molding was completed or not, was inspected by the following method.

General packaging materials (A) [OPP/LLDPE; 63 μm], (B) [CPP (simplex); 50 μm], (C) [CPP/PP-Copolymer; 50 μm] were applied. One linear rib 11 having an arc-shaped section was constructed on a heating body 1, and the effect of sealing by crush molding was confirmed.

Since it was found that at least 0.1-1.0 mmφ is applicable to crushing through preliminary experiments, a groove with a semi-circular section of about 1.0 mm in width was formed on the heating body 1, and a round bar with 1 mmφ was buried therein to keep heating pass. Then, the height of the linear rib was 0.5 mm.

In this experiment, the elastic body was not mounted, and only the effect of the local pressing by the linear rib was examined.

The characteristics of the materials to be tested are as follows:

(A) is a packaging material which is generally utilized for pillow-type packaging in the market.

(B) is a simplex material, and the whole body of the material is softened almost uniformly around the temperature range exhibiting adhesion. Therefore, the flexing force is small, and local press seal completes only by the stress of about 25N/10 mm.

(C) is composed of a surface layer material equivalent to (B) and a sealant to which a PP copolymer is applied.

Figure 8:
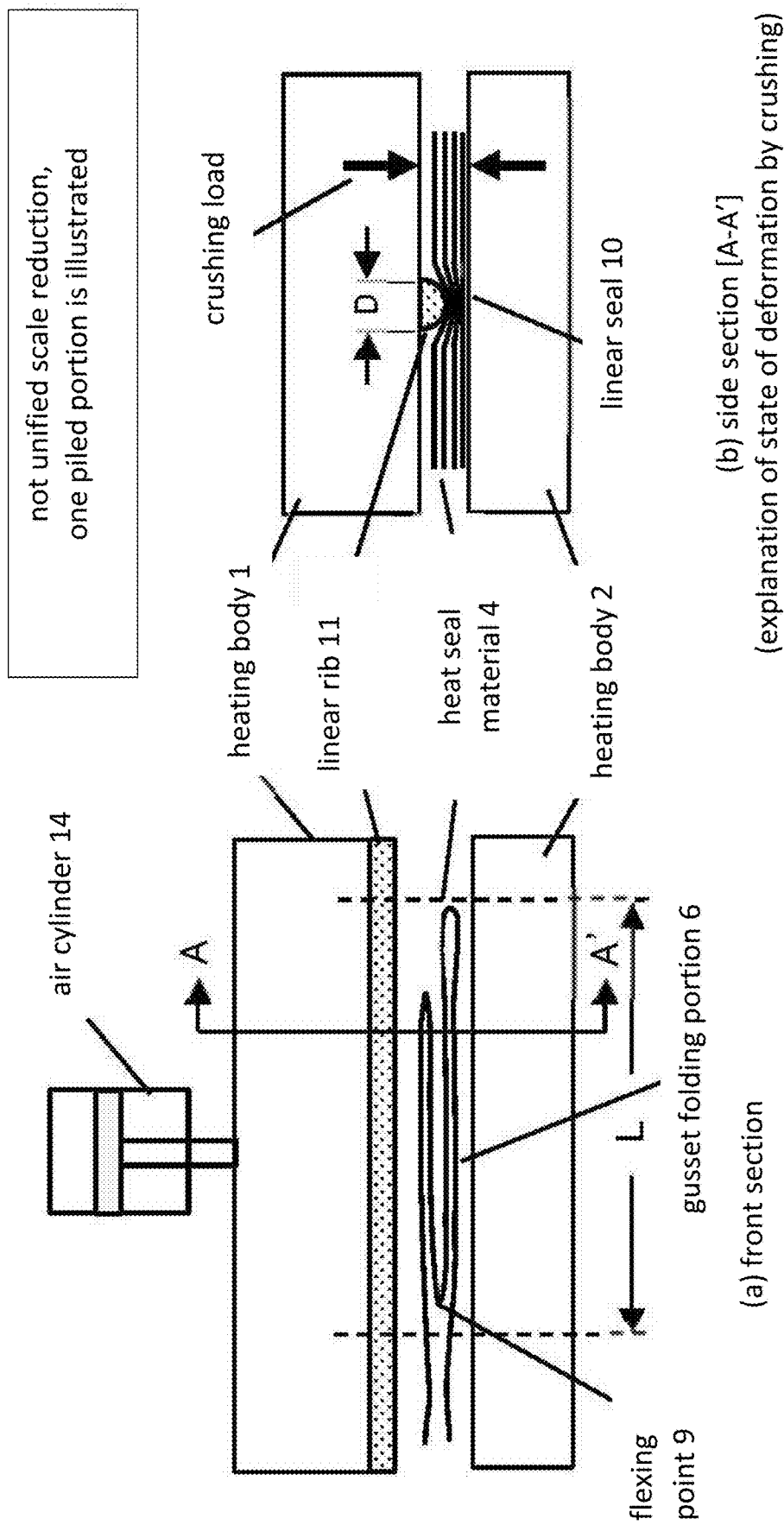
FIGS. 8A, 8B are a front view indicating confirmation of local crushing effects at a piled seal portion, and a sectional view taken along line A-A' thereof, respectively.

The heating surface temperature value of the heating bodies 1, 2 was set to be identical, and heating was carried out from the peelable seal temperature range (interfacial adhesion temperature range) Tp to the rupture seal temperature range (agglomerate bonding temperature range) Tb. (see FIG. 2) The surface temperature of the heating body, where the heating body contacts with the material, was controlled with an accuracy of 0.2-0.3° C. by using the method of Japanese Patent No. 4623662. The press portion of the heat seal apparatus used for the confirmation experiments and the construction of the material are shown in FIG. 8. As shown in the figure, in the heat seal apparatus, one of the pair of planar heating bodies 1, 2 is movable by the air cylinder 14, and the linear rib 11 is provided on the heating body 1 at the center in the longitudinal direction.

As shown in FIG. 8A, the folding of the material was conducted so that the width L of the 4-sheets piled portion was made 10-50 mm by adjusting the position of the flexed portion 9. The top portion was made inconsistent with a distance of about 1 mm. The applied load was adjusted accurately by controlling the supply pressure by the air cylinder 14 to apply the load so as to generate 125N constantly. One side of the gusset folding portion 6 was used for the test. Actual press force per unit length is inversely proportional to the width L of the piled portion.

Even at the same temperature, when heating for a long time, heating of the step line is completed by the conduction of heat through the material to lose faults. Therefore, the results is different from actual fault phenomena. In order to simulate heating so as to conform with actual conditions, the pressing time was set to be the shortest time to reach the equilibrium temperature by utilizing the measurement of the fused face temperature (see Japanese Patent No. 3465741). The heating time in this experiment was in 1-3 seconds.

Figure 4:
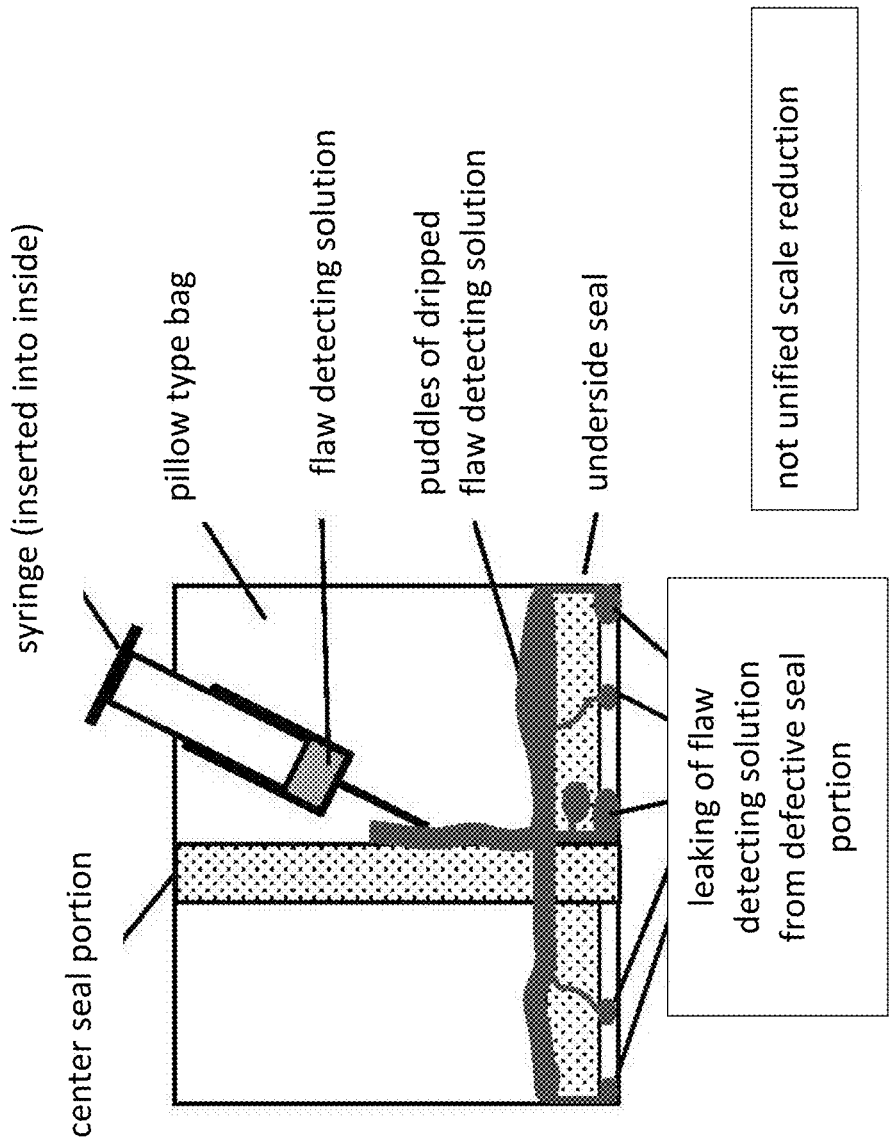
FIG. 4 is a drawing explaining the test method for the fault portion of heat seal by the flaw detecting solution.
Figure 5:
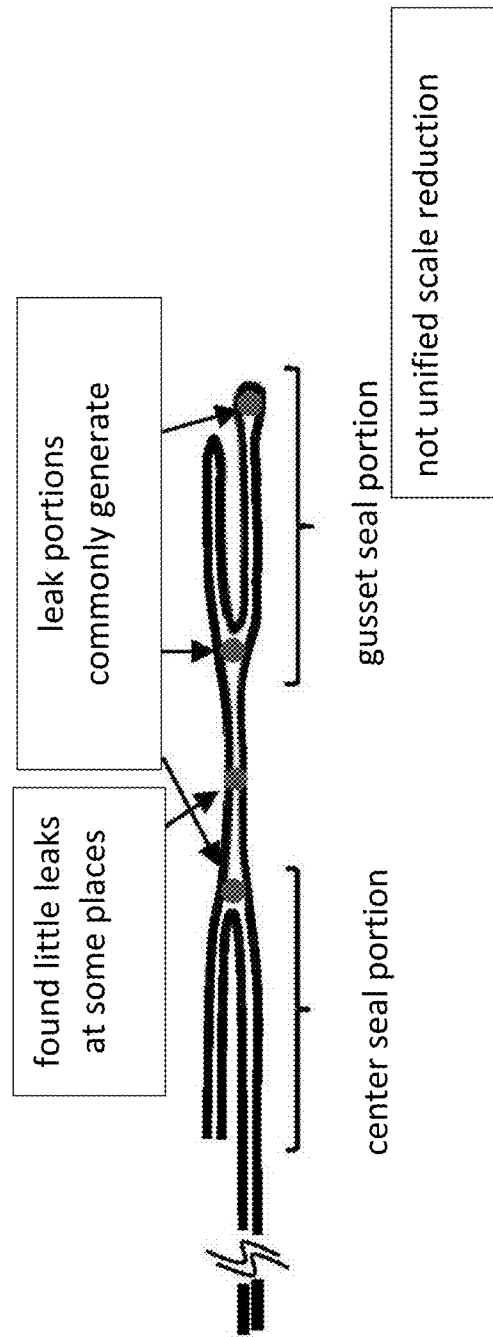
FIG. 5 is a sectional view indicating the reproduction test results of faults at the piled seal portion.

Elements relating to the adhesion or not of the step portion concern heating temperature zone, press load, the height of the piled portion and properties of the material (mainly rigidity). The linear seal portion 10, after press adhesion with heating, was examined by the flaw detecting solution method shown in FIG. 4. The test results are summarized and shown in Table 1. From the results, the approximate load and temperature region necessary for the completion of local press adhesion could be identified for general packaging materials.

TABLE 1

Results of analyzing generation factor of fault seal at step portion (linear rib height 0.5 mm, press load is converted to per 10 mm)

| | name of material | | | | | | | | |
|---|---|---|---|---|---|---|---|---|---|
| | OPP/LLDPE; 63 μm | | | CPP (simplex); 50 μm | | | CPP/PP-copolymer; 50 μm | | |
| boundary temp. between peelable/rupture seal | 108 | | | 138 | | | 128 | | |
| piled portion width [L] (mm) | 10 | 30 | 50 | 10 | 30 | 50 | 10 | 30 | 50 |
| press load (N/10 mm) | 125 | 42 | 25 | 125 | 42 | 25 | 125 | 42 | 25 |
| adhered state at middle temp. in peelable seal temp. | X | X | X | ○ | ○ | X | ○ | X | X |
| adhered state at boundary temp. between | ○ | ○ | X | ○ | ○ | X | ○ | ○ | X |
| adhered state in rupture seal temp. zone (Tb) | ○ | ○ | ○ | ○ | ○ | ○ | ○ | ○ | ○ |

Local press adhesion in all other planar areas was completed by the linear rib 11. The result in Table 1 evaluates the sealability around the flexed portion 9 individually. It can be estimated that, in the peelable seal zone with small adhesion strength, since restoring force of the flexed portion is greater than the adhesive force, close adhesion is inhibited.

It can be seen that, in the peelable seal generation zone, a stress of 42N/cm or more is necessary for the completion of local press adhesion. The stress value corresponds to the applied load f1 shown in FIG. 8. When the sealant approaches a melted state. Close adhesion is possible at the step lines even by the stress of 25N/1 cm.

By observing a section at a local mold seal portion, which was actually finished, with a microscope, the effect obtained by rendering the top of the linear rib arc-shaped was confirmed, that the extra portion of melt molding was protruded into not adhered portion which was about 50% of the width of the linear rib.

Assuming that about 50% of the width of the linear rib participates in pressing, the area per 1 cm in length of the linear rib is 10×0.25=2.5 mm2. When the load applied in the test was converted to the stress, the load 25N; 10 MPa, the load 4N; 17 MPa.

Since proper press adhesion pressure at conventional heat sealing is 0.1-0.4 MPa, it can be seen that a very large stress of about 100 times the conventional stress is needed for the mold adhesion by local pressing at the step portion. In the case of practicing this by planar pressing, an enormous load is needed. The effectiveness of the local pressing by the linear rib was thus confirmed. In the case of setting plural linear seals, local press load is proportionally increased.

Heretofore, it was said that application of agglomerate bonding is indispensable for close adhesion seal. From the experimental results shown in Table 1, it was seen that close adhesion seal is possible even in a peelable seal zone (interfacial adhesion zone) by the mold seal formed by the local pressing using the linear rib.

As a result, conditions to complete a linear seal could be made clear where the control elements are heating temperature zone, press load, and length (width) of piled portion.

It was confirmed that mold close adhesion is possible by a load of about 40N/10 mm or more, even by heating in peelable seal zone. By applying the characteristics, easy opening utilizing adhesive surfaces can be achieved simultaneously with sealing.

In the rupture seal temperature zone Tb, although the close adhesion is completed at the step portion, the sealant or the material is in melted state. Therefore, the material is easily ruptured by linear pressing, and the finish is not suitable for opening utilizing adhesive surfaces.

The width and the depth of the linear seal formed by the linear rib of the heating body fundamentally agrees with the width and the height of the linear rib. The width of the linear seal is about 0.05-2 mm, preferably about 0.1-1.5 mm, and the depth is about 0.05-2 mm, preferably 0.1-1.5 mm. A suitable adhesive strength of the linear seal is about 2-15N/15 mm, preferably 2-12N/15 mm.

The linear seal is provided in a band-shaped peelable heat seal in its longitudinal direction, and it is preferred to be located not at the center of the band-shaped peelable heat seal but on the side of the outer edge, preferably in the range of about 60-90% of the total width from the inner edge (see FIG. 10A).

The number of the linear seals is basically one, but it is possible to provide a plurality, such as two lines or three lines, with increasing local press load, within the range where the function and effects of the invention is not harmed.

In the case that the heat seal area is curved, it is preferred that the linear seal is provided along the curve (see FIG. 10B).

The composite heat seal structure described herein can be made by a heat seal apparatus composed of a couple of heating bodies and a working mechanism and heating mechanism thereof.

The heating bodies are fundamentally the same as those of a conventional heat seal apparatus, and the couple of the heating bodies are constructed and arranged so that the heating surfaces are located in parallel, and therefore, upon heat-sealing, pressing is carried out with uniform pressure in the whole area. The heating surface is usually in plane. At least, the width of one heating surface is made only to heat the heat seal portion to be formed on the heat seal material. The other heating surface may be identical, or may be broader than that to be functioned as a pedestal. The material to be used is having a high heat conductivity, such as copper, aluminum, brass, or stainless steel.

The working mechanism, that nips or releases the heat seal material by the heating bodies, may be the same as a conventional heat seal apparatus, and the working may be conducted by moving only one heating body or by moving both.

The heating mechanism to heat the heating bodies may also be the same as a conventional heat seal apparatus, and commonly, electricity is used.

This apparatus is characterized by providing the heating plane of one of the heating bodies with a linear rib integrally.

Figures 1A, 1B:
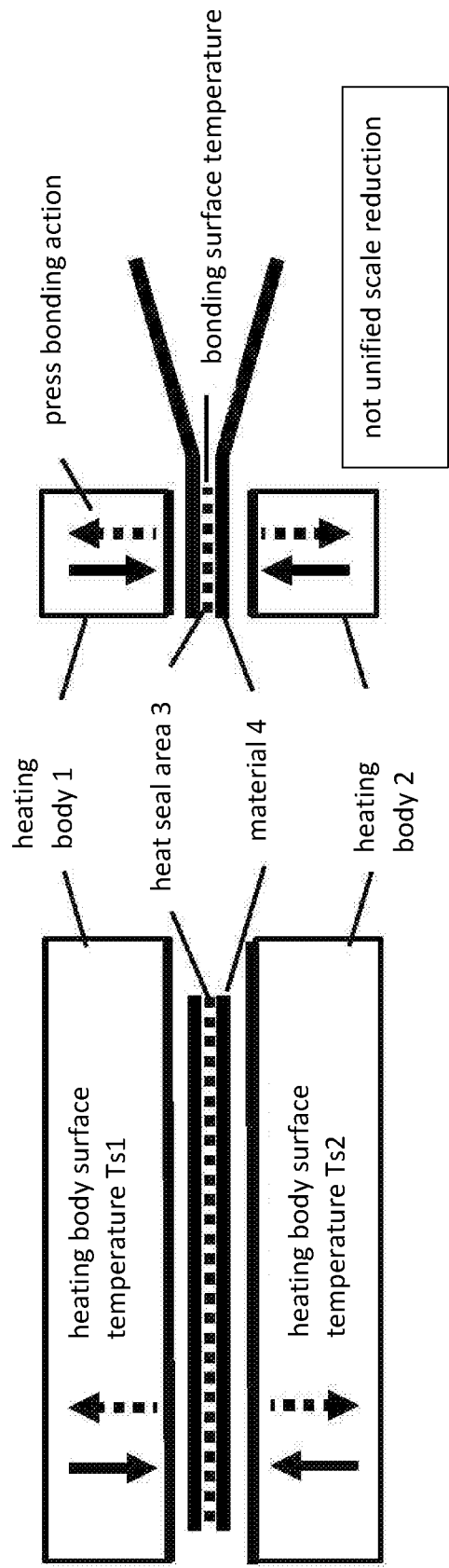
FIGS. 1A, 1B are schematic views illustrating an usual sandwich heating bodies system.
Figure 2:
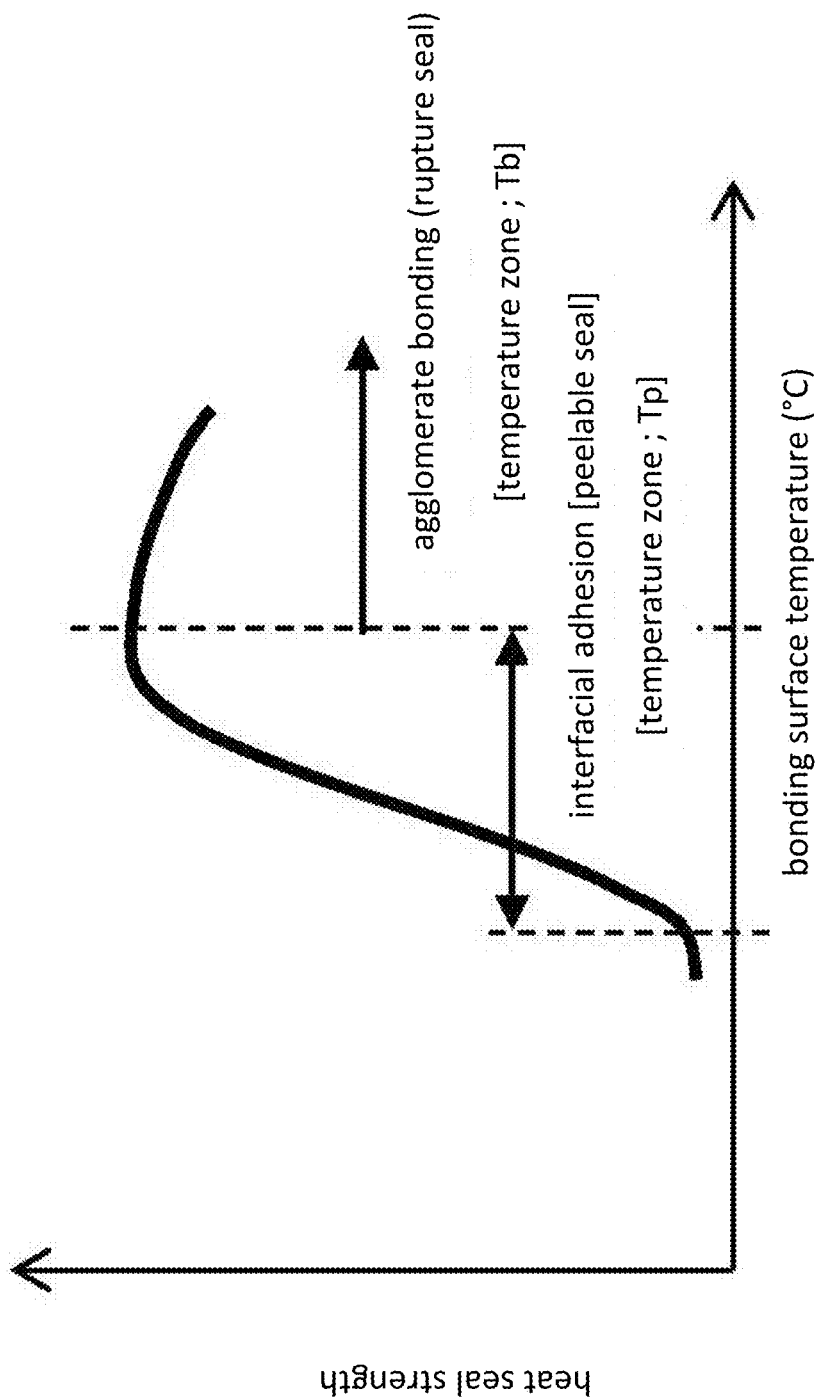
FIG. 2 is a graph illustrating schematically the relationship between heating temperature and the mode (heating speed; f) of the appearance of heat seal strength (peelable seal and rupture seal).
Figure 3:
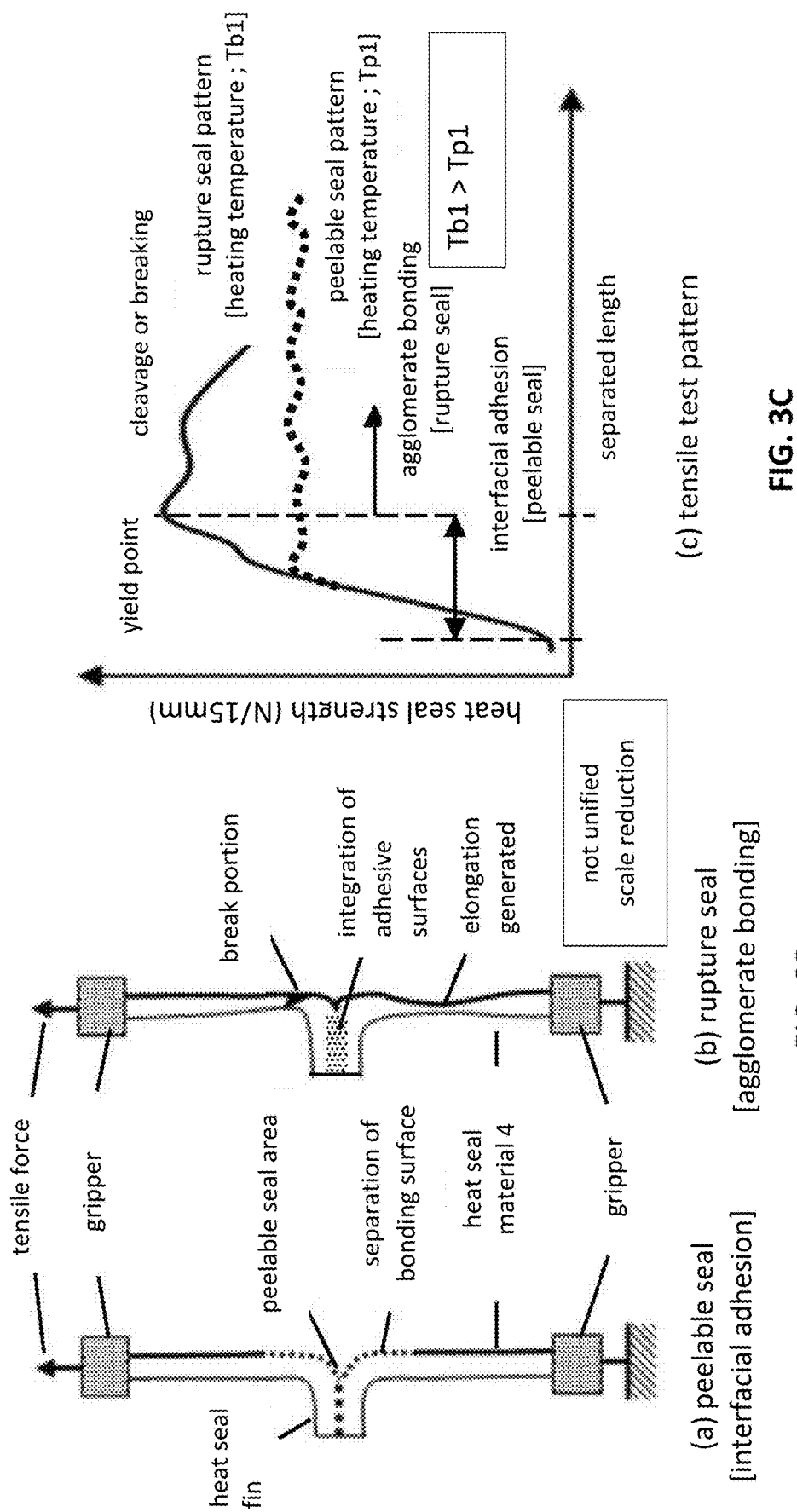
FIGS. 3A-3C are explanatory drawings explaining the test method of heat seal strength and the state of appearance (JIS Z0238, according to ASTM F88-7a).
Figures 11A, 11B:
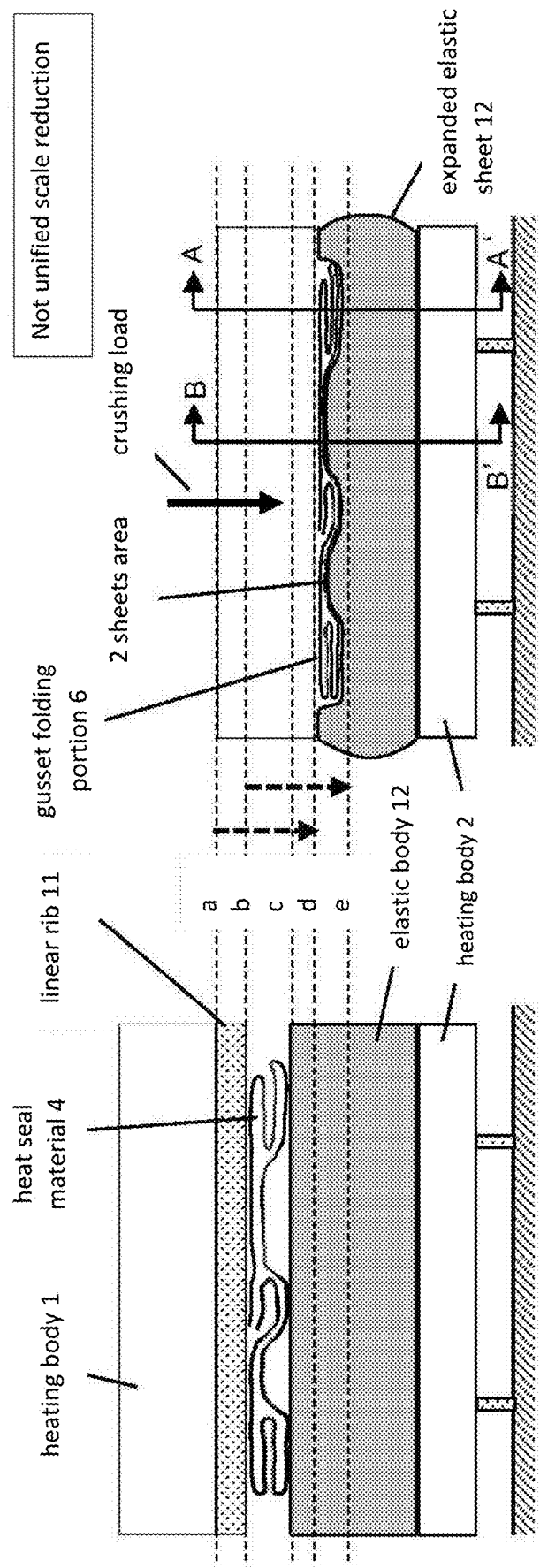

The heat-sealing is shown schematically in FIG. 11. This illustrates a state of heat-sealing an end of a gusset bag. In the pair of the heating bodies 1, 2, a sheet of elastic body 12 is mounted on the heating surface which is the top of the underside heating body 2, and a linear rib 11 is provided on the outer edge side from the center of the heating surface which is the underside of the upside heating body 1 in the longitudinal direction. The height of the linear rib 11 is the distance between lines a-b. A state of nipping an end of the gusset bag between two heating bodies 1, 2 is shown in the same FIG. 11A. Subsequently, the upside heating body 1 is allowed to descend, as shown in the FIGS. 11B-D, the gusset bag is pressed into the elastic body 12 by its crushing load. Then, as shown in FIG. 11C, the gusset folding portion 6 and the step portion, which are 4-sheet portions, are heat-sealed by local pressing of the linear rib 11, and as shown in FIG. 11D, 2-sheet portions 7 are also pressed by the deformation of the elastic body. Distance c-f corresponds to the maximum sunk depth d3. Actually, it is 0.4-2 mm.

Reason for Combined Setting of Planar Adhesion

The close adhesion at the step portion is possible by the local pressing of the linear rib. However, since the produced narrow linear rib seal line tends to be broken by applying an outer force directly, the planar adhesion area which is a peelable seal is set in combination around the seal line to protect it by utilizing the separation energy (corresponds to the separation of 0-9 mm in FIG. 14).

When planar pressing is started after the linear rib 11 has sunk into a definite depth, since the press load can be dispersed without concentrating to local press, characteristics can be obtained that the rupture at local press portion caused by overload can be self-controlled.

Although it is possible to separate the adhesion of the linear rib portion and that of the planar area into respective processes, the equipment is complicated. Moreover, by heating twice, crystallization occurs in the first heated adhesive surface to lose adhesion ability through Hishinuma effects (see "Kanzume Jiho (Canning News Information)", vol. 91, No. 11, p 21-34, 2012), and therefore, this is not proper.

It is a very effective method to achieve two requirements simultaneously by one heating to press operation, because good heat control can be done, and the operation is industrially simple.

Determination of the Size of the Linear Rib Upon Transferring from Local Pressing to Planar Heating A linear round bar of 0.2 mm, 0.3 mm, 0.5 mm or 0.9 mm (corresponding to the height of the linear rib) was placed on a heat-resistant silicone sheet having a Shore hardness of A50, A70, or A80 and thickness of 1-5 mm directly (without placing a plastic material), and compression tests were conducted at ordinary temperature. Taking the variation of local press into consideration, the press plate was used of a size of 1 cm×2 cm. The round bar 2 cm in length was allocated at the center in the longitudinal direction of the press plate. The measured results were converted to the value per the press area of 1 cm² and the length of the linear rib of 1 cm.

Figure 13A:
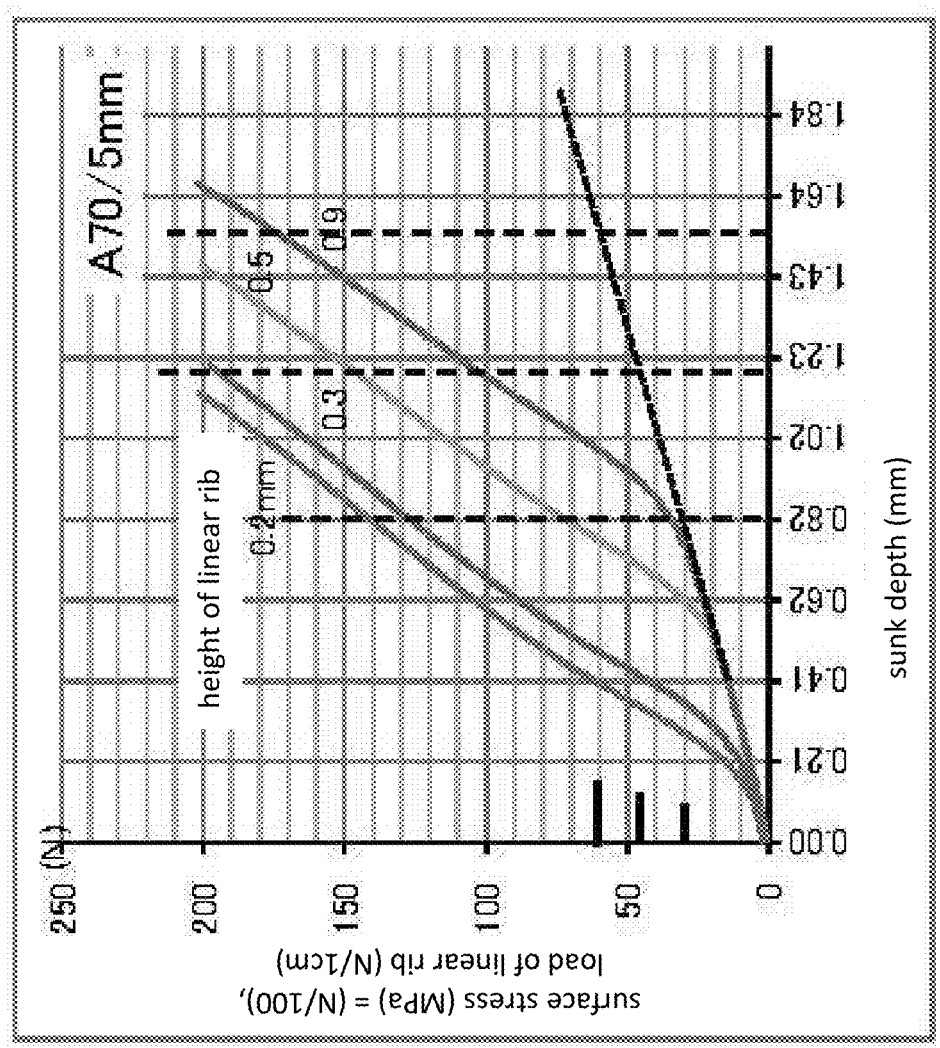
FIGS. 13A, 13B are graphs showing the results of measuring the relationship between the height of a linear rib and the generated stress, as to two types of the elastic body.
Figure 13B:
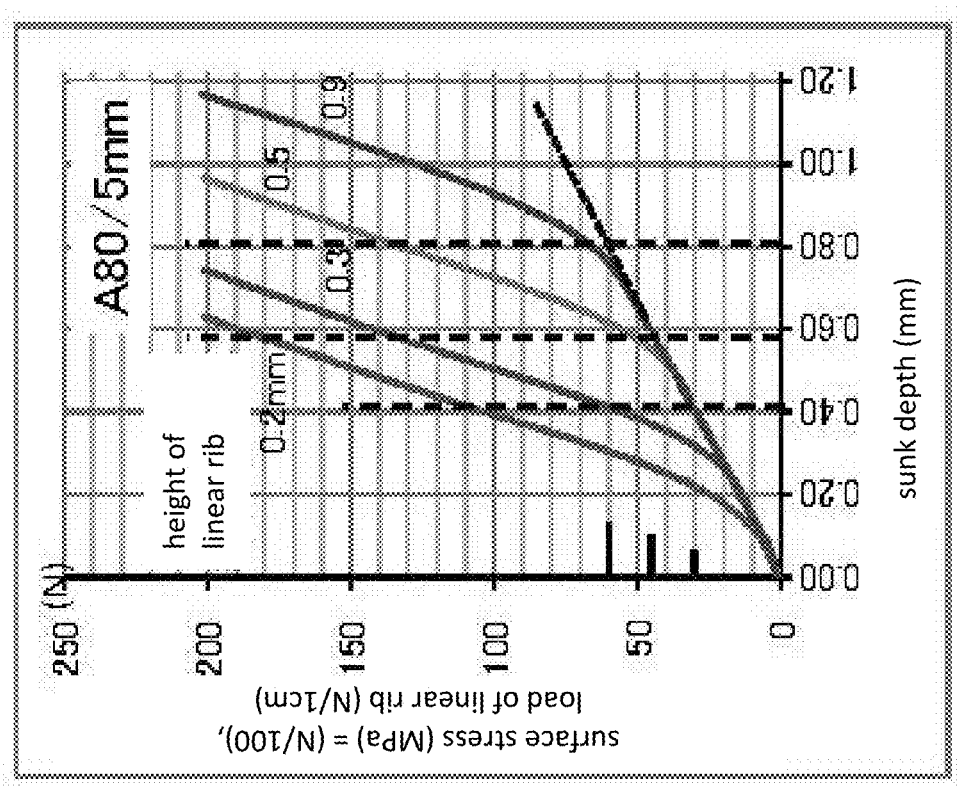

As can be seen in FIG. 13, in which representative examples of the measured results are shown, graphs containing branch points to transfer to planar press after the linear round bar (height of the linear rib) sunk the thickness of the bar, were obtained.

In the measurement range of 0.1-0.9 mm in the height of the linear rib, irrespective of the thickness, almost identical characteristics were exhibited that the sunk load of the linear rib elevates linearly. Auxiliary lines showing sunk depth corresponding to the load of 30, 45, or 60N required for the linear rib were added in the Y axis of the figure.

Figure 9:
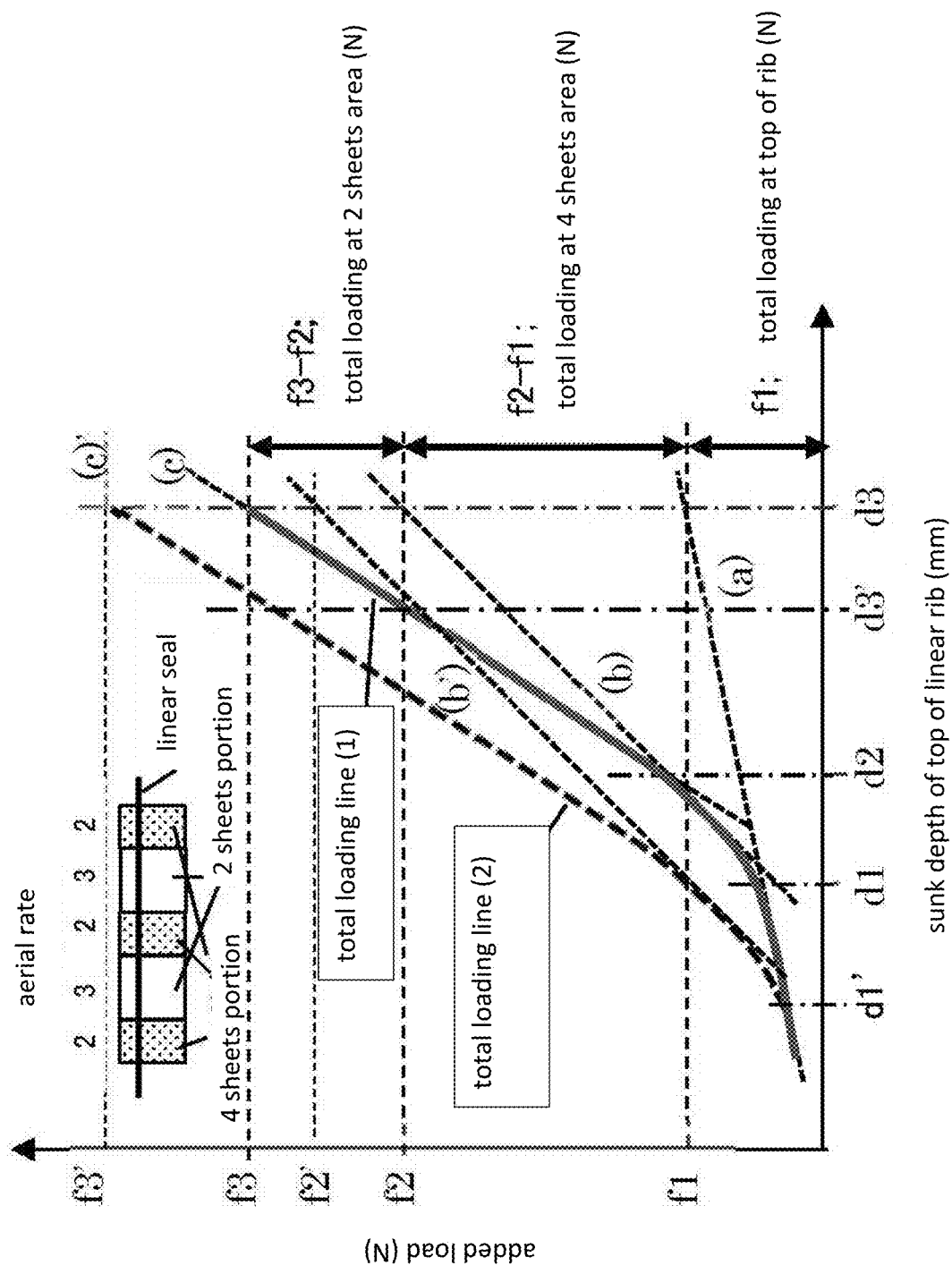
FIG. 9 is a graph explaining a relationship between the sunk depth of the linear rib described herein and press bonding pressure turned into a model.

From the results of FIG. 13, a simulation as to the load mechanism on the top of the linear rib portion 11 and the planar portion in the press operation described herein is explained using FIG. 9.

Each symbol in FIG. 9 is defined as follows:
dn: height of linear rib
d1: bent width of rubber plate immediately before linear rib sunk (only rib portion)
d2: bent width of rubber plate immediately before sunk in 4-sheet area (including rib portion)
d3: bent width of rubber plate after sunk is added in 2-sheet area
f1: thrusting force of linear rib immediately before sunk (N)
f2: (load at top of linear rib)+(compression load immediately before sunk in 4-sheet area) (N)
f3: (load at top of linear rib)+(sinking compression load in 4-sheet area)+(sinking compression load in 2-sheet area) (N)

(1) A rubber plate is placed on the underside of the jaw (fixed base) and two sheets of plastic material of about 30 mm×20 mm were piled thereon at the center. Each two sheets of the same plastic material of about 20 mm×10 mm were piled thereon at the center at an interval of 10 mm.

(2) A linear rib (round bar of 0.2-0.5 mm) 20 mm in length is fixed around the center of a metal plate of 20 mm×10 mm.

(3) The metal plate to which the linear rib was fixed on the upside of the jaw was parallel to the underside.

(4) The upside of the jaw is connected to a compression driving source through a load tester.

(5) The center of the linear rib plate is allowed to align with the center of the plastic material placed on the rubber plate.

(6) When the compression source is driven in descending direction, the metal plate on the upside of the jaw starts to contact with the rubber plate through the plastic. When reached d1=dn+(bent width), planar contact of the linear rib plate begins.

(7) The load of the descending motion until d1=dn+(bent depth) indicates sinking of the linear rib. The compression load characteristic at this time is segment (a).

(8) The compression operation continues at a constant speed, and when it exceeds d1, compression at the 4 sheet area starts. The load at this time indicates the sum of the sinking load at the linear rib and the 4 sheet area. The compression load characteristic at this time is the segment (b).

(9) When the compression further continues, sinking at the 4 sheet area is finished to reach d2, and compression at the 2 sheet area starts.

(10) At the compression finish point d3, a stress of 0.1-0.4 MPa is needed for the 2-sheet area.

Moreover, it is selected so as to apply 30-60N/cm at the top of the linear rib.

If proper conditions cannot be found in the case of the applied rubber plate, reselection is conducted from rubber plates having a different hardness.

From the above progress (see FIG. 9):

(1) The line connecting load 0 and d1 and its extrapolated line are the segments (a) of compression load characteristic of the linear rib.

(2) The line connecting d1-d2 is the segment (b) of the sum of [sinking load of linear rib] and [compression characteristic of the 4 sheet area].

(3) The line connecting d2-d3 is the segment (c) of [sinking load of linear rib]+[compression sinking load at the 4 sheet area]+[compression sinking load at the 2 sheet portion].

(4) The desired results in this operation are:
1) Ensuring the load of linear rib of 30-60N/cm
2) To apply a stress of 0.1-0.4 MPa to the 2-sheet area
3) Although the 4 sheet area falls in high pressed conditions, it is left to follow its natural course.
4) Elastic rubber capable of achieving the requirements of 1) and 2) simultaneously is selected.

5) Referring to the compression property of respective rubber plates shown in FIG. 13 (linear rib and planar compression property), a corresponding rubber plate is selected in the above simulation range.
6) Even with the same rubber plate, the load of the linear rib and the stress at the 2 sheet area can be controlled strictly by varying the height of the linear rib.

Determination of Height of Linear Rib

The branch point d1 of transferring to planar press shown in FIG. 9 can be determined by the selection of the height of the linear rib 11. As an example, setting the height of the linear rib at 0.3 mm can be done by fitting a round bar of 0.6 mm in diameter into a processed groove of the heating body 2 to form a linear rib of 0.3 mm in height. Similarly, the height of the linear rib of 0.2-0.9 mm was determined. Practically, it is preferred to cut the heating surface of the heating body 1 into the corresponding arc shape.

The result of varying d1 to d1+ is shown by the dotted total load line (2) in FIG. 9.

Since compression at the 4 sheet area can be accelerated by rendering small the size of the linear rib to be d1', the compression pressure can be raised in the 2-sheet area by the same compressed depth. The compressed depth can be moved toward its step area. As a result, the compression rate of the final rubber plate is made small, and thereby, it protects the rubber plate from damage.

The load value (f1-f3) of respective elements (linear rib portion, 4-sheet area, 2-sheet area) can be determined by the difference of the extrapolated line, as shown in the figure.

The compressed depth herein is determined by the hardness and thickness of the rubber plate, and it is 0.4-3 mm.

For rendering d1 small, when the height of the linear rib is made 0.05 mm or less, the rib is merely thrust into the material to decrease the effect sharply. The height of the linear rib is 0.05-2 mm, preferably 0.1-1.5 mm, particularly preferably 0.1-1 mm.

The necessary sunk depth can be controlled by the planar press stress/load force to be applied.

When the load is applied by using an air cylinder or oil pressure cylinder with an adjustment of pressure or through springs as a constant load source, the sunk depth d3 is not necessary to be managed directly by a measurement. Alternatively, a spacer corresponding to the maximum compressed depth is set between the upper jaw and the lower jaw, and when a load slightly greater than the maximum load is applied, the compression force can be automatically applied by the elasticity of the rubber.

The top of the linear rib 11 is processed into an arc-shape in section to avoid the rupture of the material by the concentration of the load sharply and to prepare a relief of plastic deformation of the material. The concentration of the stress by the local press is controlled by selecting the diameter of arc in the linear rib.

The height of the linear rib is set so that, after sinking the designed size, the pressing force is automatically transferred to pressing of planar area, and the height is preferably a half cut of the arc or less, preferably 20-100%, more preferably 50-100% of the radius of the arc. Accordingly, the width of the linear rib is, in general, 0.05-2 mm, preferably 0.1-1.5 mm, particularly preferably 0.1-1 mm. Thereby, the over pressing at local press is self-controlled.

The length of the linear rib is determined so as to be applied at least to the thickened area by piling, for example a 4 sheet area and a 3 sheet area, and in general, it may be the total heat seal length.

The number of the linear ribs is fundamentally one, but may be plural, such as 2-3 ribs.

The linear rib is preferably not located at the center of heating surface of the heating body 1. In the case of one rib, it is preferably formed at a position of 60-90%, preferably 70-80% from the inner edge of the seal of a bag. Thereby, the planar adhesion area on the inside of the linear rib seal portion of the bag is made greater than that on the outside to increase protection of the linear rib seal portion.

Explanation of the Load Mechanism

In this model, when load f3 is applied to the linear rib portion, sinking of d3 occurs into the elastic body 12 (see FIG. 9). The sinking is determined by the hardness and thickness of the elastic body, and therefore, it becomes a selection index of the elastic body.

In this simulation, d1, d3 (freely selected) can be measured experimentally, and therefore, f3 can be measured directly. f1 can be determined by extrapolating the 0-d1 segment. Since the load characteristic of the 4 sheet area can be extrapolated by approximating the straight line from d2 of the total load line, f2 can be found.

Based on this finding, it can be seen that f3-f2 acts on the 2 sheet area, f2-f1 acts on the 4-sheet area, and f1 acts on the linear rib.

Referring to these decomposition characteristics, each setting element of the height of the linear rib (transferring point to planar press), thickness, hardness of the elastic body, and applied load is selected.

There is a limitation of load for the utilization of the elastic body. In order to ensure the elasticity and durability of the elastic body, on the premise that the compressibility is less than 40%, the utilization range was set as follows: 3 mm sheet≈less than 1.5 mm, 5 mm sheet less than 2 mm), total compression load less than 280N (2.8 MPa) (resistance to load and loading ability of the apparatus). Although the lower end of the compressibility is not limited, it is usually until 5%.

By adding these conditions, representative evaluation results of the sinking stress in FIG. 13, etc. are shown in Table 2. Using hardness, thickness, and local pressing force as parameters, the applicability of a linear seal was evaluated to general packaging materials. The proper ranges were encircled by a bold line.

It was confirmed that the linear seal described herein is practical under the conditions of the hardness of elastic body (A50-A80), the thickness (3-5 mm), and the height of linear rib (0.1-0.9 mm).

TABLE 2

Confirmation results of proper sinking stress to heat-resistant elastic sheet

| linear rib load | A50/5 mm | | | | | A70/5 mm | | | | | A80/5 mm | | | | |
|---|---|---|---|---|---|---|---|---|---|---|---|---|---|---|---|
| | sunk depth | linear rib height (mm) | | | | sunk depth | linear rib height (mm) | | | | sunk depth | linear rib height (mm) | | | |
| (N/10 mm) | (mm) | 0.2 | 0.3 | 0.5 | 0.9 | (mm) | 0.2 | 0.3 | 0.5 | 0.9 | (mm) | 0.2 | 0.3 | 0.5 | 0.9 |
| 30 | 1.4 | 150 | 135 | 113 | 86 | 0.8 | 145 | 133 | 77 | 36 | 0.4 | 105 | 55 | — | |
| 45 | 2.0 | 205 | 184 | 162 | — | 1.3 | 235 | 215 | 170 | 127 | 0.6 | 135 | 140 | 55 | — |
| 60 | 2.6 | >280 | >280 | >280 | — | 1.9 | >280 | >280 | 250 | 215 | 0.8 | 260 | 220 | 132 | 67 |

| linear rib load | A50/3 mm | | | | | A70/3 mm | | | | | A80/3 mm | | | | |
|---|---|---|---|---|---|---|---|---|---|---|---|---|---|---|---|
| | sunk depth | linear rib height (mm) | | | | sunk depth | linear rib height (mm) | | | | sunk depth | linear rib height (mm) | | | |
| (N/10 mm) | (mm) | 0.2 | 0.3 | 0.5 | 0.9 | (mm) | 0.2 | 0.3 | 0.5 | 0.9 | (mm) | 0.2 | 0.3 | 0.5 | 0.9 |
| 30 | 1.0 | 165 | 148 | 118 | 50 | 0.8 | 150 | 130 | 130 | 56 | 0.4 | 126 | 75 | — | — |
| 45 | 1.3 | 230 | 215 | 183 | 135 | 1.2 | 225 | 200 | 200 | 165 | 0.6 | 260 | 205 | 78 | 49 |
| 60 | >2 | — | — | 255 | 205 | >2 | — | — | — | — | 0.8 | >280 | 270 | 197 | 72 |

(planar load) = (total load) − (linear rib load)
compressibility of 40%: 3 mm thick; 1.2 mm, 5 mm thick; 2.0 mm The elastic body adjusts the local pressing load caused by sinking the linear rib of which the height is adjusted by its elastic coefficient, and also acts as an elastic pedestal for planar heating. The bending width (sunk depth) and expressed stress of the elastic body are gained by the selection of thickness and hardness, and necessary press force is self-controlled. A suitable hardness is about A40-A90, preferably about A50-A80 in Shore hardness, and a suitable thickness is about 0.5-8 mm, preferably about 1-5 mm.

Moreover, the elastic body also needs heat resistance capable of resistance to the heat seal temperature. As examples of preferred materials, silicone rubber, fluororubber, and the like can be listed. It is preferable to select a sheet-shaped heat-resistant elastic body which can add a pressure of 0.1-0.5 MPa to a 2-sheet area within the compression of about 30% thickness of the elastic body (rubber plate). In addition, elastic bodies subjected to high heat conduction treatment are preferred in order to raise operation speed.

Incidentally, since a rigid packaging material is actually present between the linear rib and the elastic body, it is necessary to correct the size of the linear rib according to the thickness of the material or the properties of the material. The branch point d1 between sinking of the linear rib and planar pressing in FIG. 13 moves toward the greater side according to the rigidity of the material.

Measured results of transferring d1 of representative heat seal materials are shown in Table 3.

This confirmation was carried out at room temperature. Since pressing is carried out actually under heating conditions, the load at d1 point is smaller than these values. However, it is preferred to design the linear rib referring to Table 3.

From the actual measurements of the relationship with the thickness of general materials, it was found that, as to the size of the linear rib, selecting a size greater than the total thickness of the material is preferred.

Addition of Heat Generation to the Linear Rib

The linear rib accelerates closer adhesion than planar press areas by increase pressing to add plastic deformation of the material. As a relief of plastic deformation at local portions, since a space of tens of μm remains around the base of the linear rib, the heat transfer ability is decreased. In addition, heating is conducted through minor portions of the rib, and thereby, heat flow is reduced.

Furthermore, as shown in Table 1, sealing performance of the linear seal is not always sufficient in a peelable seal zone, and the range utilizing a peelable seal, where easy peelability (easy opening) and sealability are compatible, is narrow. Therefore, it is preferable to compensate for the shortage of heating around a local press portion and to ensure individual controllability of heating operations at the linear rib portion, by adding a heat generation function to the linear rib 11.

A construction of a heating process at the linear rib portion is shown in FIG. 12. In this example, a nichrome wire was used as the linear rib. Electrical insulation between the nichrome wire and the heating body was performed by

TABLE 3

Correction of branch point by thickness of material

| linear rib size | load at branch point without material | copy paper (mm) | | HDPE (mm) | | | CPP (mm) | | |
|---|---|---|---|---|---|---|---|---|---|
| (mm) | (N/10 mm) | 0 | 0.4 | 0.2 | 0.4 | 0.6 | 0.05 | 0.1 | 0.2 |
| 0.2 | 10 → | 10 | disappear | disappear | disappear | disappear | 10 | 13 | 15 |
| 0.3 | 15 → | 20 | 25 | 30 | 35 | disappear | 15 | 20 | 20 |
| 0.5 | 20 → | 30 | 35 | 40 | 45 | 50 | 20 | 20 | 25 |
| 0.9 | 40 → | 50 | 60 | 60 | 75 | 85 | 40 | 45 | 50 | interposing a TEFLON™ sheet 50 μm in thickness. The inserted insulating material 15 also functions to form a temperature difference in heating between the heating body and the linear rib.

The insulating material can be formed by utilizing a treatment to produce an oxide membrane on the heating surface of the heating body 1 or the surface of the linear rib bar, a treatment to coat a heat-resistant resin, or the like. To utilize the resin treatment is convenient, because of simultaneous fixing of the linear rib bar.

In the method shown in FIG. 12, the heating electric current was made constant. Heating management is facilitated by employing a constant current heating system, where the heat generation per unit length of the linear rib heat generation body is controlled by the current volume.

Two sheets of CPP (50 μm) were nipped and sealed according to the method of FIG. 8, wherein a nichrome wire 0.4 mmφ of about 20 mm was buried in the heating surface of the jaw and the elastic sheet was not mounted, at a pressing pressure of 60N/cm with varying constant electric current amount.

The evaluated results are shown in Table 4, wherein the charged power per 1 cm was employed as a parameter.

As the heating body temperature in this inspection, 140° C. was selected which is around the boundary temperature between the peelable seal and the rupture seal of the material. Under these conditions, the material is in an overheated melted state by only a slight temperature elevation. Therefore, it is convenient for judgment of the suitability of the auxiliary heating by the linear rib.

From this result, it was found that when charged electric power was raised to 0.22 W/cm or more per 1 cm of the linear rib wire, overheating appeared to be fused or easily fractured. A great improvement was exhibited as the assistance of heating in 0.18-0.20 W/cm.

As to the heat generation body 0.6 mmφ in thickness of the linear rib bar (nichrome wire) (linear rib; 0.3 mm), it was also confirmed by a similar control of heat generation power.

Since a space of tens of μm is formed around the linear rib, heating is insufficient there. Thereupon, by adding a heat generation function to the linear rib, the insufficient heating around the local press portion could be compensated for, and the individual control ability of heating operations at the linear rib portion could be ensured.

TABLE 4

Results of investigating proper heat generation of linear rib (Examples)

| applied current (A) | charged power (W) | generated power per 1 cm of linear rib wire (W/cm) | finishment of linear rib seal |
| --- | --- | --- | --- |
| 1.0 | 1.5 | 0.08 | only a little effect |
| 1.5 | 3.2 | 0.16 | influence begins to appear on the surface temp. of heating body |
| 1.6 | 3.5 | 0.18 | improvement begins |
| 1.7 | 3.9 | 0.20 | great improvement |
| 1.8 | 4.3 | 0.22 | fracture by repeat bending |
| 1.9 | 4.8 | 0.24 | fracture easily by external force |
| 2.0 | 5.2 | 0.26 | fracture occurred | measuring conditions: material; CPP50 μm, thickness of linear rib bar; 0.4 mmφ, height of rib; 0.2 mm, pressing pressure; 60 N/cm, surface temp. of heating body; 140° C. (high temp. conditions, melt fracture easily occur)

As a result of conducting similar experiments as to other materials, it was found that the compensation quantity for heat generation by the linear rib varies according to the heat capacity and thickness of the material.

The heat seal methods described herein can be carried out similar to conventional heat seal operations to form a peelable seal without a great conversion, except for providing a linear rib on the heating surface of one of the heating bodies and an elastic body having a proper elasticity corresponding thereto on the other.

The heating surface temperature of the heating body which conducts heat-sealing is set so as to form a peelable heat seal. The peelable heat seal is defined in ASTM F88-07a, and the bonding conditions are in interfacial adhesion by intermolecular bond.

The method to render a peelable seal can be, as shown in FIG. 2, determined by measuring heat seal strength (adhesive strength) of the material to be heat-sealed while varying its temperature.

Herein, the temperature is adjusted so as to obtain a desired adhesive strength in the temperature range forming a peelable seal. A preferred temperature rendering a peelable seal is, for example, in the range of 136-144° C., preferably 138-142° C., for polypropylene having commonly a melting point of 170° C.

The temperature of the linear rib is generally the same as that of the heating surface due to being set on the surface of heating body. However, since the heating portion is minor, the heat flow rate is short. When the selected heating zone is on the low temperature side, since completion of a seal fails at the linear seal portion due to the shortage of heating, it is desirable to elevate the temperature by about 3-5° C. utilizing the heat generation function.

In a common heat seal, pressing pressure of 0.1-0.4 MPa is needed. Then, the height of the linear rib and the elasticity of the elastic body are adjusted so that the load of about 25-60N/10 mm, preferably about 30-50N/10 mm is added from the top of the linear rib to the heat seal material.

The selection of an actual working time varies depending on the thickness and heat conductivity of the packaging material, and therefore, it is desirable to determine a proper operation speed by the measurement of the response of the fusion surface temperature.

Herein, when pressing of the material to be heat-sealed is gradually increased by the heating body, the 4-sheet area pressed by the linear rib portion sinks into the elastic body. While compression proceeds, a part of the elastic body rises with plastic deformation caused by the sinking of the 4-sheet area and the linear rib portion. Thereby, the 2-sheet areas of the material are accelerated to be pushed up, and are pressed to contact with the heating body on the opposite side. However, since the piled step portion, having an acute angle, cannot be pressed completely, through holes of tens of μm remain around the step portion.

An areal adhesion is made by adding areal load to the 2-sheet area utilizing the plastic deformation of the elastic body by crushing, to provide a protection function from breakage of the linear rib seal (separation energy of 0-9 mm in FIG. 14). Herein, complete adhesion at the step line is not required other than at the linear rib portion.

When the load of the linear rib reaches a defined value or more, local adhesion of the heat seal material by the linear rib is completed.

To create the adhesive area, interfacial adhesion or agglomerate bonding is conducted by controlling the surface temperature of the heating body. In order to achieve easy openability, it is necessary to finish the peelable seal state of interfacial adhesion.

EXAMPLES

Example (1) Standard Examples

Heat seals were conducted under the following conditions:

Top diameter of the linear rib: about 50% of 0.4, 0.6, 1.0 mmφ (nichrome wire) was buried to prepare the linear rib in height: 0.2, 0.3, 0.5 mm.

Applied elastic body: heat-resistant silicone rubbers with Shore hardness; A50, A70, A80 thickness; 3, 5 mm Sample: single film: polypropylene (CPP); 50 μm Sample structure: length of gusset portion; 20 mm×2 center seal width; 20 mm, 2 sheets area; 35 mm×2

Total length of sample: 130 mm, heat seal width; 15 mm (inside of linear seal; 10 mm, outside; 5 mm) press area; 1950 mm2 (see FIG. 10 (a))

Test conditions: cover material of sample; 0.05 mm "TEFLON™" sheet (flat) [protection from fusion of material to heating body]

load control: air cylinder output with accurate pressure control; 0.3-0.6 MPa/generated load; 400-800N surface temperature control range of applied sample: 134-144° C. (±0.2° C.), (heating speed; CUT; 2.0 s)

Prior to heating the heat seal material 4, the elastic body 12 was heated to a set temperature by pressing the heating body 1 to contact with the elastic body so that the surface temperature of the silicone rubber falls in the temperature zone capable of forming a peelable seal. Thereafter, the heat seal material 4 was immediately pressed and heated.

Heating time; since the shortest time (99.9%) to reach the equilibrium temperature was about 2 s according to the measurement of the response to the fused face temperature, it was set to 3 s by adding 1 s.

After heating treatment; after finishing press heating, it was immediately cooled by pressing an aluminum block at room temperature to contact it.

Evaluation test of peelable seal and sealability according to linear seal

Adhesive strength (2-sheet area): according to JIS Z0238, ASTM F88-07a, tensile tests were carried out under the conditions of sample width: 15 mm, distance between grips; 60 mm, pulling speed; 50 mm/min.

Protection function by peelable seal was confirmed by applying the measurement of separation energy at planar adhesion area.

Observation of sealability at local adhesion portion; the flaw detecting solution was dripped on the inside of the heat seal line, and the permeation state was observed visually using a magnifier ×15 after several minutes, and evaluated.

By varying the heating temperature (fusion face temperature) of 138° C., 140° C., 140° C. being in the peelable seal zone, the elastic body with A50, A70, A80, 3, 5 mm thick, and the linear rib height of 0.2, 0.3, 0.5 mm, experiments were carried out, and the results were evaluated visually as to sealability and finish of the adhesive surface, and shown in Tables 5-7. These specimens with the linear seal had a peelable seal strength according to the heating temperature, and heat sealed surfaces were uniformly separated. An example of the tensile test for the separation is shown in FIG. 14.

In the tables, the left side of "/" indicates the finish of the adhesive surface, and the right side indicates the sealability.

The finish of the adhesive surface was evaluated as follows:

○ finish without generation of wrinkles on the 2 sheet area except around linear rib Δ the state of remaining wrinkles sparsely on the 2-sheet area x the state of generating wrinkles on the whole surface of the 2 sheet area The sealability was evaluated as follows:

○ the state where the seal was completed entirely

Δ the state where the seal was not completed at one or two portions x the state where the seal was not completed at three or more portions Symbols in each frame in the tables indicate the following conditions:

NG sealing impossible

G sealing completed

I Improvement in sealing by the complement of heating

As the criterion of evaluation, when sealing was completed, it was evaluated good, irrespective of the presence of wrinkles in the 2 sheet area.

SC press region where the compression rate exceeds 30%

When exceeding 30%, the deformation rate of the compressed portion in the linear rib arrived at the greatest. By repeating operations, the damage of the linear rib portion was particularly severe. The compression rate of not leaving a compression mark at this portion was determined experimentally.

TABLE 5

Examples of linear seal [sample: CPP; 50 μm]
linear rib height; 0.5 mm

| Shore hardness | A50 | | A70 | | A80 | |
|---|---|---|---|---|---|---|
| pressing pressure f3 | t = 3 mm | t = 5 mm | t = 3 mm | t = 5 mm | t = 3 mm | t = 5 mm |
| 136° C. heat seal strength of 2 sheet area; 2.8N/15 mm (peelable seal) | | | | | | |
| 0.19 | Δ/X | Δ/X | X/X | Δ/X | X/X | X/X |
|  | I  NG | I  NG | I  NG | I  NG | I  NG | I  NG |
| 0.22 | ○/X | ○/X | Δ/X | Δ/Δ | Δ/X | Δ/X |
|  | I  NG | I  NG | I  NG | I  NG | I  NG | I  NG |
| 0.26 | ○/X | ○/X | ○/X | ○/Δ | ○/X | ○/X |
|  | I  NG | I  NG | I  NG | I  NG | I  NG | I  NG |
| 0.27 | ○/Δ | ○/X | ○/Δ | ○/○ | ○/Δ | ○/Δ |
|  | I  SC | I  SC | I  SC | SC | I  SC | I  NG |
| 0.32 | ○/Δ | ○/X | ○/Δ | ○/○ | ○/Δ | ○/Δ |
|  | SC | SC | SC | SC | SC | SC |

TABLE 5-continued

Examples of linear seal [sample: CPP; 50 μm]
linear rib height; 0.5 mm

| Shore hardness | A50 | | A70 | | A80 | |
|---|---|---|---|---|---|---|
| pressing pressure f3 | t = 3 mm | t = 5 mm | t = 3 mm | t = 5 mm | t = 3 mm | t = 5 mm |
| 138° C. heat seal strength of 2 sheet area; 3.2N/15 mm (peelable seal) | | | | | | |
| 0.19 | △/X<br>I  NG | △/X<br>I  NG | △/X<br>I  NG | △/X<br>I  NG | X/X<br>I  NG | △/X<br>I  NG |
| 0.22 | ○/X<br>I  NG | ○/X<br>I  NG | ○/X<br>I  NG | ○/X<br>I  NG | △/△<br>I  NG | △/X<br>I  NG |
| 0.26 | ○/X<br>I  NG | ○/X<br>I  NG | ○/△<br>I  NG | ○/X<br>I  NG | ○/○<br>G | ○/△<br>I  NG |
| 0.27 | ○/X<br>I  SC | ○/X<br>I  SC | ○/○<br>SC | ○/X<br>I  SC | ○/○<br>SC | ○/△<br>I  NG |
| 0.32 | ○/X<br>SC | ○/X<br>SC | ○/○<br>SC | ○/X<br>SC | ○/○<br>SC | ○/○<br>SC |
| 140° C. heat seal strength of 2 sheet area; 5N/15 mm (peelable seal) | | | | | | |
| 0.19 | △/X<br>I  NG | △/X<br>I  NG | X/X<br>I  NG | △/X<br>I  NG | X/X<br>I  NG | △/X<br>I  NG |
| 0.22 | ○/X<br>I  NG | ○/X<br>I  NG | △/△<br>I  NG | ○/X<br>I  NG | △/X<br>I  NG | △/X<br>I  NG |
| 0.26 | ○/○<br>G | ○/○<br>G | ○/○<br>G | ○/○<br>G | ○/○<br>G | ○/○<br>G |
| 0.27 | ○/○<br>SC | ○/○<br>SC | ○/○<br>SC | ○/○<br>SC | ○/○<br>SC | ○/○<br>G |
| 0.32 | ○/○<br>SC | ○/○<br>SC | ○/○<br>SC | ○/○<br>SC | ○/○<br>SC | ○/○<br>SC |
| 142° C. heat seal strength of 2 sheet area; 7N/15 mm (peelable seal) | | | | | | |
| 0.19 | △/X<br>I  NG | △/X<br>I  NG | X/△<br>I  NG | △/X<br>I  NG | X/X<br>I  NG | △/X<br>I  NG |
| 0.22 | ○/X<br>I  NG | ○/X<br>I  NG | △/○<br>G | ○/X<br>I  NG | X/△<br>I  NG | ○/X<br>I  NG |
| 0.26 | ○/○<br>G | ○/○<br>G | ○/○<br>G | ○/○<br>G | ○/○<br>G | ○/○<br>G |
| 0.27 | ○/○<br>SC | ○/○<br>SC | ○/○<br>SC | ○/○<br>SC | ○/○<br>SC | ○/○<br>G |
| 0.32 | ○/○<br>SC | ○/○<br>SC | ○/○<br>SC | ○/○<br>SC | ○/○<br>SC | ○/○<br>SC |
| 144° C. heat seal strength of 2 sheet area; 14N/15 mm (peelable seal) | | | | | | |
| 0.19 | △/○<br>G | △/○<br>G | X/○<br>G | △/○<br>G | △/○<br>G | △/○<br>G |
| 0.22 | ○/○<br>G | ○/○<br>G | △/○<br>G | ○/○<br>G | △/○<br>G | △/○<br>G |
| 0.26 | ○/○<br>G | ○/○<br>G | ○/○<br>G | ○/○<br>G | ○/○<br>G | ○/○<br>G |
| 0.27 | ○/○<br>SC | ○/○<br>SC | ○/○<br>SC | ○/○<br>SC | ○/○<br>SC | ○/○<br>G |
| 0.32 | ○/○<br>SC | ○/○<br>SC | ○/○<br>SC | ○/○<br>SC | ○/○<br>SC | ○/○<br>SC |

TABLE 6

Examples of linear seal [sample: CPP; 50 μm]
linear rib height; 0.3 mm

| Shore hardness | A50 | | A70 | | A80 | |
|---|---|---|---|---|---|---|
| pressing pressure f3 | t = 3 mm | t = 5 mm | t = 3 mm | t = 5 mm | t = 3 mm | t = 5 mm |
| 138° C. heat seal strength of 2 sheet area; 3.2N/15 mm (peelable seal) | | | | | | |
| 0.19 | △/X<br>I  NG | △/X<br>I  NG | △/X<br>I  NG | △/X<br>I  NG | X/X<br>I  NG | △/X<br>I  NG |
| 0.22 | △/X<br>I  NG | ○/X<br>I  NG | △/X<br>I  NG | △/X<br>I  NG | △/X<br>I  NG | △/X<br>I  NG |
| 0.26 | ○/X<br>I  NG | ○/X<br>I  NG | ○/X<br>I  NG | ○/△<br>I  NG | ○/X<br>I  NG | ○/X<br>I  NG |
| 0.27 | ○/△<br>I  NG | ○/△<br>I  NG | ○/△<br>I  NG | ○/△<br>I  NG | ○/X<br>I  NG | ○/X<br>I  NG |
| 0.32 | ○/○<br>SC | ○/○<br>SC | ○/○<br>SC | ○/○<br>SC | ○/○<br>SC | ○/X<br>I  NG |

TABLE 6-continued

Examples of linear seal [sample: CPP; 50 μm]
linear rib height; 0.3 mm

| Shore hardness | A50 | | A70 | | A80 | |
|---|---|---|---|---|---|---|
| pressing pressure f3 | t = 3 mm | t = 5 mm | t = 3 mm | t = 5 mm | t = 3 mm | t = 5 mm |
| 0.35 | ○/○ SC | ○/○ SC | ○/○ SC | ○/○ SC | ○/○ SC | ○/△ I NG |
| 0.39 | ○/○ SC | ○/○ SC | ○/○ SC | ○/○ SC | ○/○ SC | ○/○ SC |
| 140° C. heat seal strength of 2 sheet area; 5N/15 mm (peelable seal) | | | | | | |
| 0.19 | △/X I NG | △/X I NG | △/○ G | △/○ G | ○/○ G | ○/○ G |
| 0.22 | △/X I NG | ○/X I NG | △/○ G | ○/○ G | ○/○ G | ○/○ G |
| 0.26 | ○/X I NG | ○/○ G | ○/○ G | ○/○ G | ○/○ G | ○/○ G |
| 0.27 | ○/○ G | ○/○ G | ○/○ G | ○/○ G | ○/○ G | ○/○ G |
| 0.32 | ○/○ SC | ○/○ SC | ○/○ SC | ○/○ SC | ○/○ SC | ○/○ G |
| 0.35 | ○/○ SC | ○/○ SC | ○/○ SC | ○/○ SC | ○/○ SC | ○/○ G |
| 0.39 | ○/○ SC | ○/○ SC | ○/○ SC | ○/○ SC | ○/○ SC | ○/○ SC |
| 142° C. heat seal strength of 2 sheet area; 7N/15 mm (peelable seal) | | | | | | |
| 0.19 | △/X I NG | ○/X I NG | △/○ G | ○/○ G | ○/○ G | ○/△ I NG |
| 0.22 | ○/X I NG | ○/X I NG | ○/○ G | ○/○ G | ○/○ G | ○/○ G |
| 0.26 | ○/X I NG | ○/○ G | ○/○ G | ○/○ G | ○/○ G | ○/○ G |
| 0.27 | ○/○ G | ○/○ G | ○/○ G | ○/○ G | ○/○ G | ○/○ G |
| 0.32 | ○/○ SC | ○/○ SC | ○/○ SC | ○/○ SC | ○/○ SC | ○/○ G |
| 0.35 | ○/○ SC | ○/○ SC | ○/○ SC | ○/○ SC | ○/○ SC | ○/△ G |
| 0.39 | ○/○ SC | ○/○ SC | ○/○ SC | ○/○ SC | ○/○ SC | ○/○ SC |
| 144° C. heat seal strength of 2 sheet area; 14N/15 mm (peelable seal) | | | | | | |
| 0.19 | ○/○ G | ○/○ G | △/○ G | ○/○ G | △/○ G | △/○ G |
| 0.22 | ○/○ G | ○/○ G | △/○ G | ○/○ G | △/○ G | △/○ G |
| 0.26 | ○/○ G | ○/○ G | ○/○ G | ○/○ G | ○/○ G | ○/○ G |
| 0.27 | ○/○ G | ○/○ G | ○/○ G | ○/○ G | ○/○ G | ○/○ G |
| 0.32 | ○/○ SC | ○/○ SC | ○/○ SC | ○/○ SC | ○/○ SC | ○/○ G |
| 0.35 | ○/○ SC | ○/○ SC | ○/○ SC | ○/○ SC | ○/○ SC | ○/△ G |
| 0.39 | ○/○ SC | ○/○ SC | ○/○ SC | ○/○ SC | ○/○ SC | ○/○ SC |

TABLE 7

Examples of linear seal [sample: CPP; 50 μm]
linear rib height; 0.2 mm

| Shore hardness | A50 | | A70 | | A80 | |
|---|---|---|---|---|---|---|
| pressing pressure f3 | t = 3 mm | t = 5 mm | t = 3 mm | t = 5 mm | t = 3 mm | t = 5 mm |
| 138° C. heat seal strength of 2 sheet area; 3.2N/15 mm (peelable seal) | | | | | | |
| 0.19 | △/X I NG | △/X I NG | △/X I NG | △/X I NG | △/X I NG | △/X I NG |
| 0.22 | △/X I NG | ○/X I NG | ○/△ I NG | ○/△ I NG | ○/△ I NG | ○/△ I NG |
| 0.26 | ○/X I NG | ○/X I NG | ○/△ I NG | ○/△ I NG | ○/△ I NG | ○/△ I NG |

TABLE 7-continued

Examples of linear seal [sample: CPP; 50 μm]
linear rib height; 0.2 mm

| Shore hardness | A50 | | A70 | | A80 | |
|---|---|---|---|---|---|---|
| pressing pressure f3 | t = 3 mm | t = 5 mm | t = 3 mm | t = 5 mm | t = 3 mm | t = 5 mm |
| 0.27 | ○/X | ○/X | ○/Δ | ○/Δ | ○/Δ | ○/Δ |
|  | I  NG | I  NG | I  NG | I  NG | I  NG | I  NG |
| 0.32 | ○/X | ○/X | ○/Δ | ○/Δ | ○/Δ | ○/○ |
|  | SC | SC | SC | SC | SC | G |
| 0.35 | ○/X | ○/X | ○/Δ | ○/Δ | ○/Δ | ○/○ |
|  | SC | SC | SC | SC | SC | SC |
| 140° C. heat seal strength of 2 sheet area; 5N/15 mm (peelable seal) | | | | | | |
| 0.19 | Δ/X | ○/X | Δ/Δ | Δ/Δ | X/Δ | Δ/Δ |
|  | I  NG | I  NG | I  NG | I  NG | I  NG | I  NG |
| 0.22 | Δ/X | ○/X | Δ/Δ | Δ/Δ | ○/Δ | ○/Δ |
|  | I  NG | I  NG | I  NG | I  NG | I  NG | I  NG |
| 0.26 | ○/X | ○/Δ | Δ/Δ | ○/○ | ○/Δ | ○/Δ |
|  | I  NG | I  NG | I  NG | G | I  NG | I  NG |
| 0.27 | ○/X | ○/Δ | Δ/Δ | ○/○ | ○/Δ | ○/Δ |
|  | I  NG | I  NG | I  NG | G | I  NG | I  NG |
| 0.32 | ○/X | ○/Δ | Δ/Δ | ○/○ | ○/Δ | ○/○ |
|  | SC | SC | SC | SC | SC | G |
| 0.35 | ○/X | ○/Δ | Δ/Δ | ○/○ | ○/Δ | ○/○ |
|  | SC | SC | SC | SC | SC | SC |
| 142° C. heat seal strength of 2 sheet area; 7N/15 mm (peelable seal) | | | | | | |
| 0.19 | Δ/X | ○/Δ | Δ/Δ | Δ/Δ | Δ/Δ | Δ/Δ |
|  | I  NG | I  NG | I  NG | I  NG | I  NG | I  NG |
| 0.22 | ○/X | ○/Δ | ○/○ | ○/○ | Δ/Δ | ○/○ |
|  | I  NG | I  NG | G | G | I  NG | G |
| 0.26 | ○/X | ○/Δ | ○/○ | ○/○ | ○/○ | ○/○ |
|  | I  NG | I  NG | G | G | G | G |
| 0.27 | ○/X | ○/Δ | ○/○ | ○/○ | ○/○ | ○/○ |
|  | I  NG | I  NG | G | G | G | G |
| 0.32 | ○/X | ○/Δ | ○/○ | ○/○ | ○/○ | ○/○ |
|  | SC | SC | SC | SC | SC | G |
| 0.35 | ○/X | ○/Δ | ○/○ | ○/○ | ○/○ | ○/○ |
|  | SC | SC | SC | SC | SC | SC |
| 144° C. heat seal strength of 2 sheet area; 14N/15 mm (peelable seal) | | | | | | |
| 0.19 | Δ/X | ○/Δ | Δ/○ | Δ/○ | Δ/Δ | Δ/Δ |
|  | I  NG | I  NG | I  NG | I  NG | I  NG | I  NG |
| 0.22 | ○/X | ○/Δ | ○/○ | ○/○ | Δ/Δ | ○/○ |
|  | I  NG | I  NG | G | G | I  NG | G |
| 0.26 | ○/X | ○/Δ | ○/○ | ○/○ | ○/○ | ○/○ |
|  | I  NG | I  NG | G | G | G | G |
| 0.27 | ○/X | ○/Δ | ○/○ | ○/○ | ○/○ | ○/○ |
|  | I  NG | I  NG | G | G | G | G |
| 0.32 | ○/X | ○/Δ | ○/○ | ○/○ | ○/○ | ○/○ |
|  | SC | SC | SC | SC | SC | G |
| 0.35 | ○/X | ○/Δ | ○/○ | ○/○ | ○/○ | ○/Δ |
|  | SC | SC | SC | SC | SC | SC |

As a result of this, in the linear rib height of 0.2, 0.3, 0.5 mm and in the heating temperature of 136-138° C. (heat seal strength; 2.8-3.2N/15 mm) falling in the peelable seal zone, a seal is impossible until the vicinity of the limit pressing pressure zone (0.27 MPa).

When heating at 140-144° C. (heat seal strength; 5-14N/15 mm), the seal is completed in the limit pressing pressure.

It can be seen that the height of the linear rib, the hardness and thickness of the elastic body, heating temperature, and pressing pressure function as control elements.

It was confirmed that the control of heat seal strength at the planar adhesion area is facilitated by the selection of the control elements, and easy opening to which the peelable seal is applied is realized by utilizing Japanese Patent No. 5435813.

By the subject matter of this disclosure, the compatibility of easy opening and seal is made possible utilizing heat adhesion surfaces.

Example (2) Improvement in Finish Range of a Linear Seal by Individual Heating by Linear Rib From the observation of the tensile tests in Example (1), it was found that, although the plastic deformation of the pressing portion in the linear rib is completed, the adhesive force at the linear rib portion is small compared with planar areas. The improvability was inspected by the aforementioned method of adding a heat generation function to the linear rib.

The linear rib portion was changed to a nichrome wire, and a heat generation function of about 0.2 W/1 cm was added, irrespective of the thickness.

Pressing with heating tests were carried out similar to Example (1), and the improvement in the seal from leakage at the linear rib heating portion was confirmed.

Tensile tests were carried out under the conditions of heating temperature 140° C., elastic sheet A70, linear rib size 0.2 mm, and the results of a peelable seal in the heated specimens are shown in FIG. 14. It can be seen that excellent separation occurred in the seal to which the linear seal was applied.

By supplying electricity to the linear rib to heat it, the adhesive portion was also made a peelable seal. The adhesive strength rose, and separation occurred similar to the planar areas. The results of improvement in sealability by applying heating of the linear rib by the supply of electricity to the experiments under the sealing impossible conditions in Example (1) are also indicated by [1] in Tables 5-7.

By the application of heating of about 0.2 W/1 cm, sealing at the linear rib portion was made possible in the proper temperature zone to generate a peelable seal. Even in a low temperature heating temperature region, the linear seal was also made possible, and for example, the linear seal was possible even in a low adhesion region where the heat seal strength is (3.2-5N/15 mm) to extend the range of easy opening.

Example (3) Inspection and Evaluation of Defect in Seal Generated in Commercial Packaged Goods by the Methods Herein The material OPP/LLDPE shown in Table 1 is a common packaging material widely applied to pillow-type packages. Commercial goods packaged in pillow-type using the material was continued to be bought from the market for six months or more, and the presence of leakage was monitored as samples. In the commercial goods, defects in seal frequently occurred around the step portion. The cause of the "faults" in the seal of the goods was inspected and evaluated by the method described herein.

Analysis/Evaluation of Material OPP/LLDPE

Figure 15:
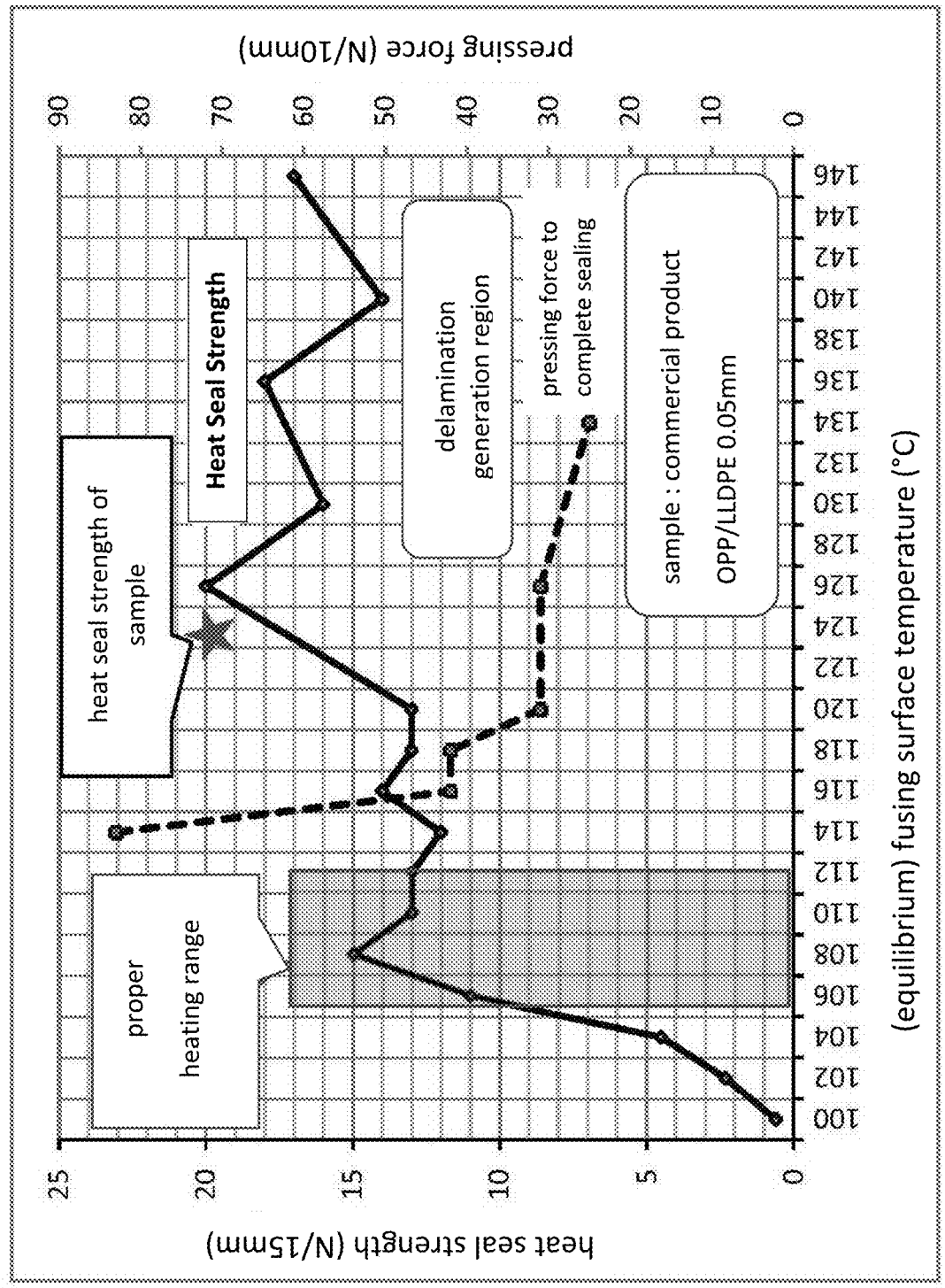
FIG. 15 is an explanatory drawing indicating an analysis example of a commercial product where a heat seal at the step portion failed.

The bag material of the goods was cut off and collected. The heat seal strength was measured, and the press load capable of sealing was confirmed through simulation tests of the linear seal. They are presented in FIG. 15.

The sealant in this material is LLDPE. The boundary temperature between the peelable seal and the rupture seal is 108° C. The proper temperature region of the sealant in the material is 105-114° C.

A big stress of 90N/10 mm was needed to achieve the close adhesion at the step portion by the linear seal at 114° C. in this temperature region. Close adhesion was possible by a stress of 30N/10 mm when heating at 120° C. or more.

The close adhesion-possible range is apart from the peelable range by 12° C. or more. In the temperature of 120° C. or more, the sealant in the material falls in overheated state to render the sealing face viscous in the agglomerate bonding region. Therefore, opening by peeling is difficult, and opening requires use of scissors.

Since the surface layer material being OPP is not in a softened state by heating around 114° C., which is an upper limit of a proper, easy opening seal, the flexed portion cannot be crushed over by the usual pressing to render its close adhesion incomplete.

The heat seal strength of the product was measured, and found to be 20N/15 mm. When the value was applied to the heat seal strength properties of the material, it is positioned around 125° C.

It seems that the manufacturer of the goods intended to soften the surface layer material by heating at 120° C. or more on the base of a rule of thumb in order to avoid leakage at the step portion.

By this example, it can be seen that it occurs by the discrepancy on the design between the proper heating temperature of the sealant and the surface layer temperature to be softened.

The defect of the conventional seal technique could be diagnosed by the application of the subject matter herein.

Example (4) Application of Linear Seal to Flat Seal

For a retort package to which an accurate seal is required, a four-sided fin seal pouch is applied due to its high reliability on heat seal. Since the four-sided fin seal pouch is made in plane, the pouch is formed steric by charging a product therein, and folds (tucks) generate on the face of the heat seal.

Usually, a heat seal is carried out in the stretched state made by grasping both sides of the heat seal area so that tucks do not form. However, flattening is occasionally not achieved by a great formation force of tucks caused by shipping on grasping or a great quantity of charged goods. In those cases, folds similar to a gusset are generated.

The generating position cannot be restricted on the heat seal area. As a result of forming a linear seal in the state of generating tucks, the heat seal could be protected from leakage. Unexpected tucking troubles can be addressed by applying the linear seal, and thereby, reliability on heat seal could be improved.

Example (5) Application to Attachment of Cap to Cup

In typical cup-type packages, such as for yogurt and coffee milk, easy opening and further minimization of splashing contents, as well as sure sealing, are required by consumers. However, heretofore, there is no technique responding to these requirements, and sealing inevitably precedes with the sacrifice of easy openability.

In the cup package of yogurt, paper stocks having elasticity are utilized. Since paper sheets have a great plastic deformability, the linear seal was tried by utilizing this property without the elastic sheet from the pedestal.

Specifications of cup material; thickness of the cup material; 40 μm thickness of the cap material; aluminum material 10 μm was applied.

Figures 16A, 16B, 16C:
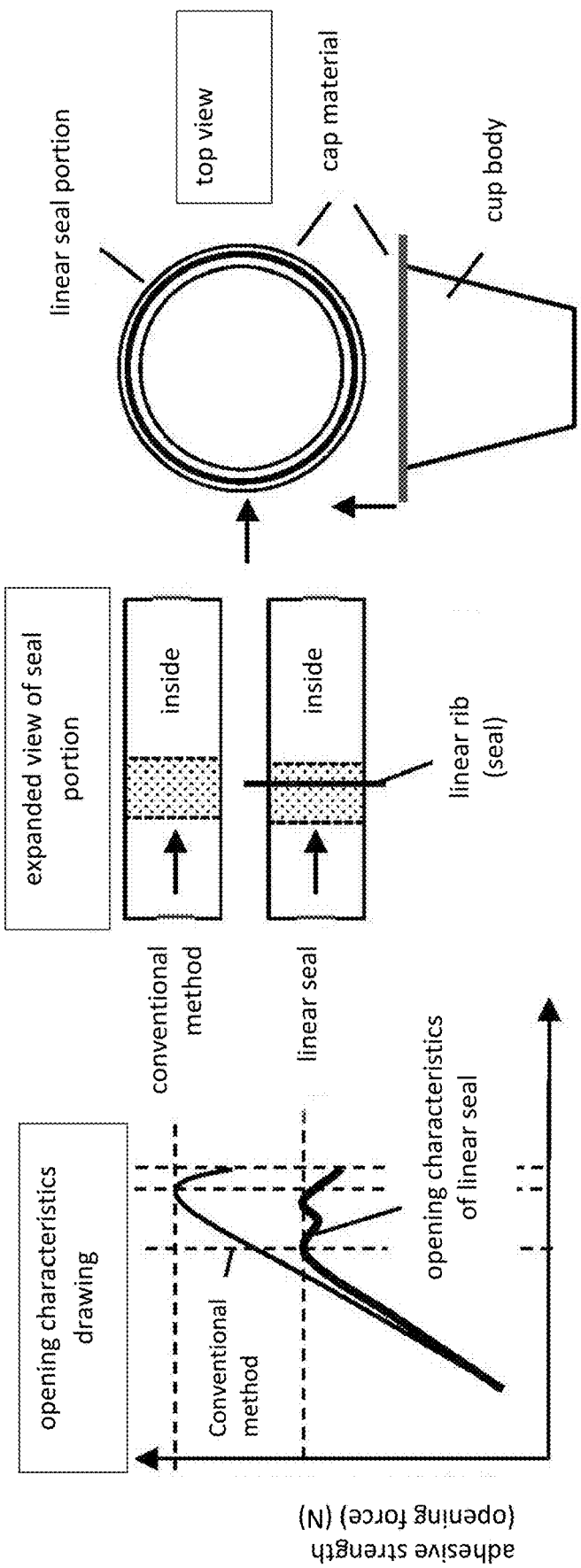
FIGS. 16A-C are drawings explaining easy opening and sealing of a cup to which the linear seal is applied.

A linear rib of 0.1 mm was constructed around the center of the ring-shaped heating body. The flange portion of the cup was placed on the pedestal, and heated to 155° C. from the cap material side. The linear rib pressed at (42N/cm) for 2 s. As a result, a fine linear seal was completed, and the planar area became a peelable seal of 7N/15 mm. Sealing could be ensured in the peelable seal temperature zone. Constructions of the peelable properties and the application of the linear seal are illustrated in FIG. 16 with respect to the conventional method and Example.

Example (6)

Application to Blister Package (PTP)

In the PTP (blister package) of medicine tablets, a press plate being knurl-shaped or embossed was used. In this method, there is no self-controllability on sinking the rib around the molded hole where the tablet enters. Therefore, when the pressing pressure is too great or the molding sheet is softened due to too high press body temperature, the knurl or emboss pushes to break the aluminum foil seal material, and thereby, to generate pinholes.

The generation of pinholes can be fundamentally improved by constructing the linear rib circle-shaped on the periphery of the molding portion where a tablet enters.

Specification of packaging material; thickness of the sheet material; 300 μm, aluminum material; 20 μm were applied.

Figure 17:
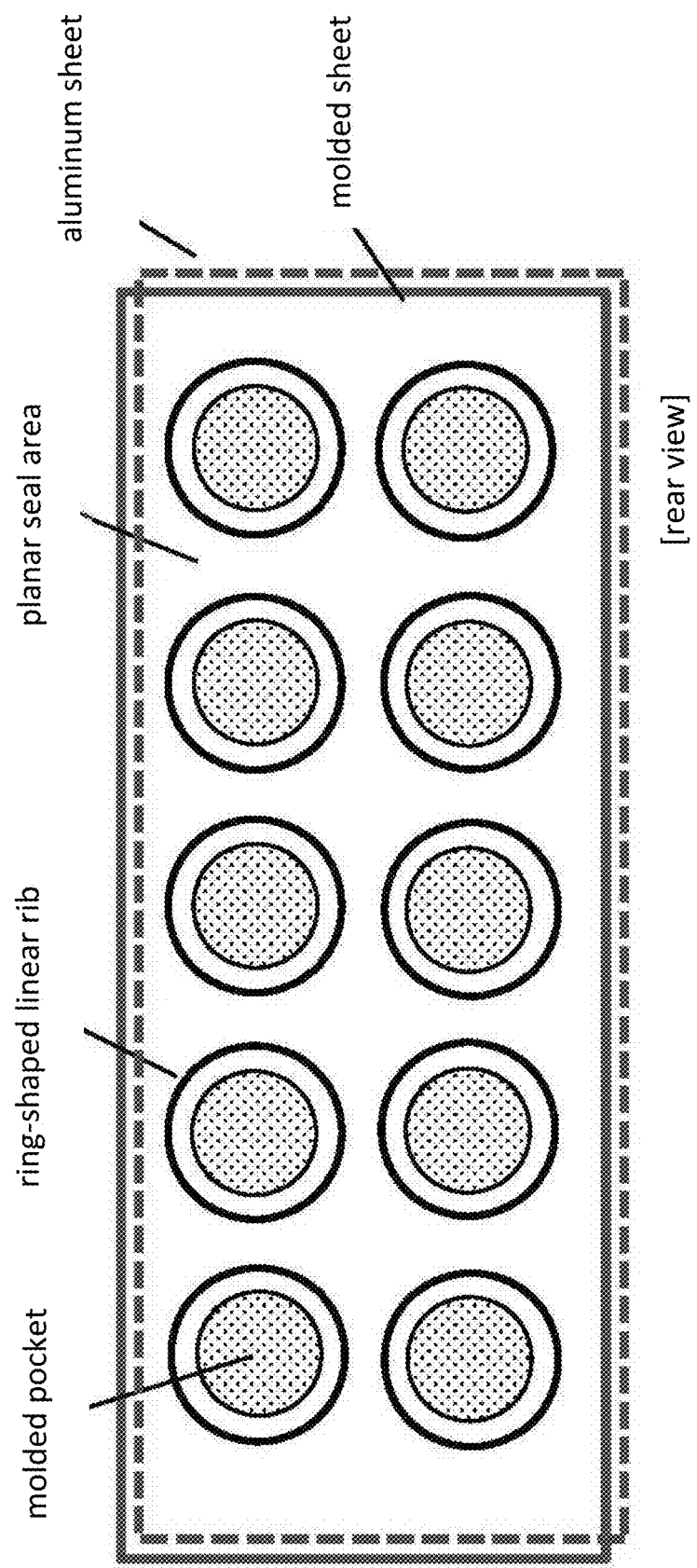
FIG. 17 is a rear view indicating a heat seal of a PTP package to which the linear seal is applied.

An elastic sheet with A70/1 mm thick was placed on a pedestal at 40° C., and a CPP molding material, cut to form a circle hole corresponding to the molded pocket for a tablet, was placed thereon. A linear rib, 0.1 mm and circle-shaped having a diameter greater than the cut pocket periphery by about 2 mm, was constructed around the center of the heating body. The molding sheet was pressed by the heating body for 2 s to obtain a uniform adhesive strength of 10N/15 mm in planar area. A flat sealed area was constructed on the periphery of the molded hole where the tablet was placed. An example of the construction of blister package to which the linear seal was applied is shown in FIG. 17.

INDUSTRIAL APPLICABILITY

By the practice of the subject matter described herein:
(1) Defects in seal generated at the step portion of a piled seal can be solved.
(2) Piled seal portions can be freely employed, and freedom of design of packaging form extended.
(3) Improvements in heat seal quality and reliability.
(4) Reduction in cost can be devised, because reasonable application of packaging material and packaging form can be selected.
(5) Sealability and openability, which are the basic problems in heat seal (presented in ASTM F88-), can be achieved together.

DESCRIPTION OF REFERENCE SIGNS 1 heating body
2 heating body
3 heat seal portion
4 heat seal material
5 center seal portion
6 gusset folding portion
7 2-sheet area
8 step portion
9 flexed portion
10 linear seal portion
11 linear rib
12 elastic body
14 air cylinder
15 insulating material
L width of 4-sheet piled area
Tp peelable seal temperature zone
Tb rupture seal temperature zone While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

I claim:

1. A method of heat-sealing a heat-sealing material using a heat seal apparatus which nips the heat-sealing material between a pair of heating surfaces, wherein a linear rib having an arc-shaped cross section with a height of 0.05-2 mm is provided in a longitudinal direction of a first of the heating surfaces, and an elastic body is mounted on only a second of the heating surfaces, the method comprising:
heat sealing the heat-sealing material with the heating surfaces at a temperature to form a peelable seal without melting the heat-sealing material, to form a heat seal having a composite heat seal structure comprising a band-shaped peelable heat seal defining a longitudinal direction along its length and a linear peelable heat seal in the band-shaped peelable heat seal in said longitudinal direction;
wherein a width and a depth of the linear peelable heat seal is the same as a width and the height of the linear rib; and
wherein said heat-sealing material comprises a step portion, and said heat sealing the heat-sealing material comprises heat sealing the step portion.

2. A method of heat-sealing as set forth in claim 1, wherein heat sealing comprises heating at 0.1-0.3 W/cm with said linear rib.

3. The method of heat-sealing as set forth in claim 1, wherein the elastic body has a Shore hardness of 40A-90A.

4. The method of heat-sealing as set forth in claim 1, further comprising:
applying a load of 25-60N/10 mm to the top of the linear rib and simultaneously applying a press pressure of 0.1-0.4 MPa to a 2-sheet area of said heat-sealing material.

5. A method as set forth in claim 1, wherein said heat-sealing the heat-sealing material is carried out in a direction traverse to the step portion.

6. A method as set forth in claim 5, wherein said heat-sealing material is made into a pillow-type bag or a gusset bag.

7. A method as set forth in claim 1, wherein said heat sealing the step portion comprises sealing without a through hole in the step portion.

8. A method as set forth in claim 1, wherein heat sealing the heat-sealing material with the heating surfaces comprises touching the heat-seal material with said heating surfaces.

9. A method as set forth in claim 1, wherein said heat sealing the heat-sealing material with the heating surfaces comprises heating the heat-sealing material to a temperature below a melting temperature of the heat-sealing material.

* * * * *